United States Patent
Poirier et al.

(10) Patent No.: US 11,577,799 B2
(45) Date of Patent: Feb. 14, 2023

(54) LOADING SYSTEM FOR A VEHICLE AND VEHICLE HAVING SAME

(71) Applicant: BOMBARDIER RECREATIONAL PRODUCTS INC., Valcourt (CA)

(72) Inventors: Kevin Poirier, Racine (CA); Charles Roy, Orford (CA); Alexandre Tardif, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/679,965

(22) Filed: Feb. 24, 2022

(65) Prior Publication Data
US 2022/0274661 A1 Sep. 1, 2022

Related U.S. Application Data

(60) Provisional application No. 63/154,555, filed on Feb. 26, 2021.

(51) Int. Cl.
*B60R 9/04* (2006.01)
*B62J 7/04* (2006.01)
*B62J 11/13* (2020.01)

(52) U.S. Cl.
CPC ........ *B62J 7/04* (2013.01); *B62J 11/13* (2020.02)

(58) Field of Classification Search
CPC ......... B66C 23/44; A01M 31/006; B60P 1/44; B60P 1/4407; B60P 1/4414; B60P 1/4421; B60P 1/4428; B60P 1/4435; B60R 9/06; B60R 9/00; B60R 9/042; B60R 9/04
See application file for complete search history.

(56) References Cited

U.S. PATENT DOCUMENTS

| | | | | |
|---|---|---|---|---|
| 3,734,321 A | * | 5/1973 | Long | B60P 3/1025 224/310 |
| 3,927,779 A | * | 12/1975 | Johnson | B60P 3/1025 414/538 |
| 7,896,604 B1 | * | 3/2011 | Donlin | B66D 1/00 212/294 |
| 8,430,286 B1 | * | 4/2013 | Patrick | B60R 9/08 224/310 |
| 9,751,592 B2 | | 9/2017 | Labbe et al. | |
| 2005/0254925 A1 | * | 11/2005 | Braquet | B60P 1/4414 414/462 |

FOREIGN PATENT DOCUMENTS

CA 3039578 A1 * 10/2020

* cited by examiner

*Primary Examiner* — Corey N Skurdal
(74) *Attorney, Agent, or Firm* — BCF LLP

(57) ABSTRACT

A loading system for a vehicle includes a buggy for transporting cargo and a mounting assembly for loading the buggy onto the vehicle. A buggy frame has an elongated member. The mounting assembly is configured to be connected to the vehicle and has a sliding rail configured to slidingly receive the elongated member of the buggy frame to allow the buggy to slide along the sliding rail. The sliding rail has a first portion and a second portion extending at an angle relative to the first portion such that, when the mounting assembly is connected to the vehicle, the first portion extends generally horizontally and the second portion extends downwardly from the first portion. The second portion is configured to slide the buggy upwards onto the vehicle. The first portion being configured to slide the buggy generally horizontally into a loaded position on the vehicle.

20 Claims, 19 Drawing Sheets

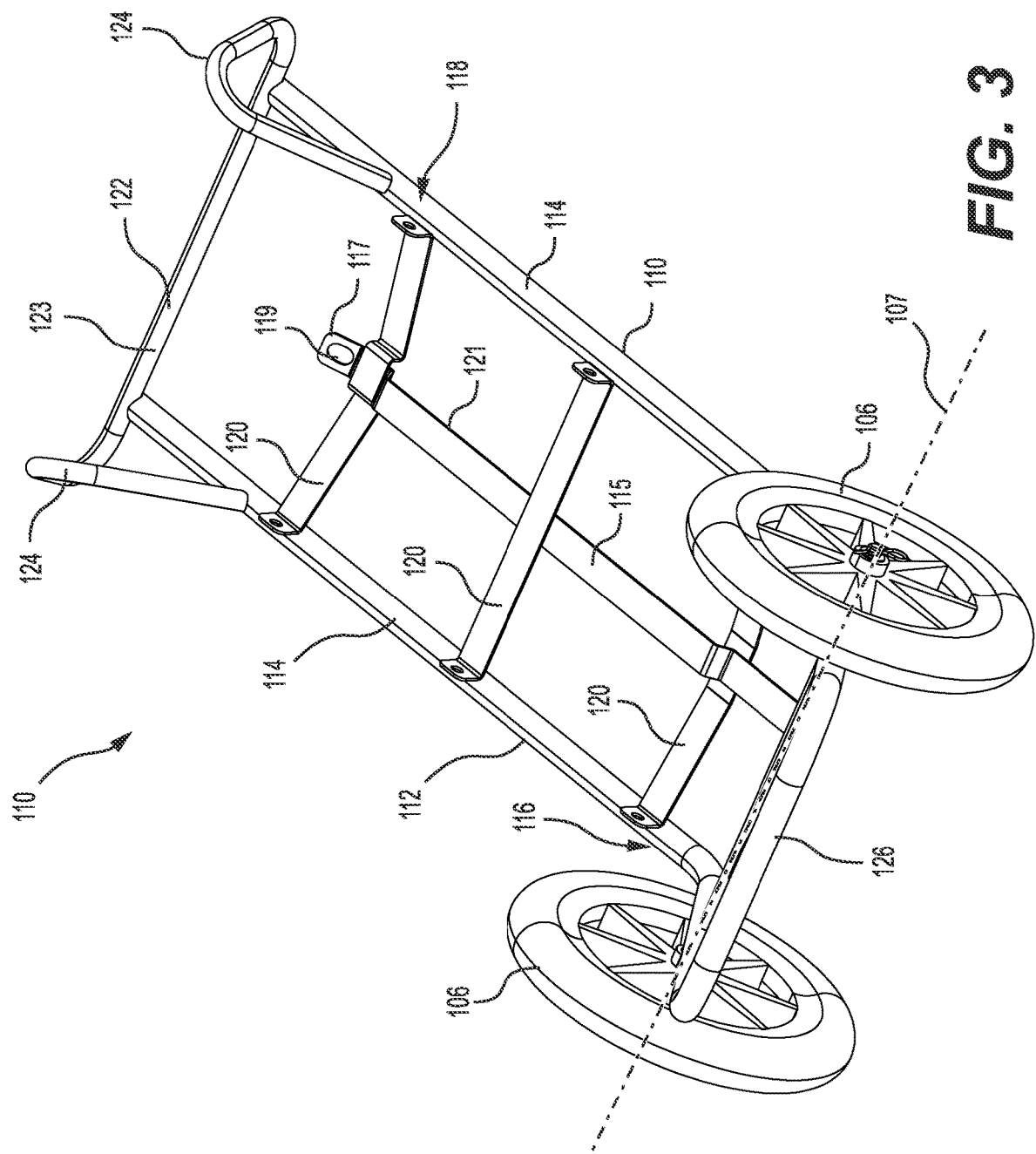

LOADING SYSTEM FOR A VEHICLE AND VEHICLE HAVING SAME

CROSS-REFERENCE

The present application claims priority from U.S. Provisional Patent Application No. 63/154,555, filed Feb. 26, 2021, the entirety of which is incorporated by reference herein.

FIELD OF THE TECHNOLOGY

The present technology relates to loading systems for loading cargo onto vehicles.

BACKGROUND

All-terrain vehicles (ATVs) and similar vehicles are often used for utility purposes. Notably, ATVs are used in different applications to carry and transport items. For example, an ATV can be used around a farm for transporting food or grain, and hunters sometimes use ATVs to get around and carry their equipment as well as hunted game.

However, the available space on an ATV that can accommodate cargo, namely at the front or rear portions of the ATV, is significantly elevated off the ground which can make loading heavy cargo onto the ATV a difficult task. Notably, loading heavy cargo on an ATV can be highly physically taxing and may in some cases require two or more people.

Thus, there is a desire for a loading system for an ATV or other such vehicles that addresses some of the aforementioned drawbacks.

SUMMARY

It is an object of the present technology to ameliorate at least some of the inconveniences present in the prior art.

According to an aspect of the present technology, there is provided a loading system for a vehicle. The loading system comprises: a buggy for transporting cargo, the buggy having an upper portion and a lower portion, the buggy comprising: a buggy frame comprising at least one elongated member, the at least one elongated member extending generally vertically when the buggy is upright; a handle disposed at the upper portion of the buggy and configured for handling by a user; a lower platform disposed at the lower portion of the buggy, the lower platform being configured for supporting cargo; and at least one wheel for rolling the buggy on a ground surface; and a mounting assembly for loading the buggy onto the vehicle, the mounting assembly being configured to be connected to the vehicle, the mounting assembly comprising: at least one sliding rail configured to slidingly receive the at least one elongated member of the buggy frame to allow the buggy to slide along the at least one sliding rail, each of the at least one sliding rail having a first portion and a second portion extending at an angle relative to the first portion such that, when the mounting assembly is connected to the vehicle, the first portion extends generally horizontally and the second portion extends downwardly from the first portion, the second portion being configured to slide the buggy upwards onto the vehicle, the first portion being configured to slide the buggy generally horizontally into a loaded position on the vehicle.

In some embodiments, the mounting assembly further comprises a locking device configured to lockingly engage a part of the buggy in the loaded position to retain the buggy to the mounting assembly in the loaded position.

In some embodiments, the part of the buggy that is lockingly engaged by the locking device is the handle such that the locking device is configured to retain the upper portion of the buggy to the mounting assembly in the loaded position.

In some embodiments, the locking device is movable between a locked position and an unlocked position, the locking device being biased to be in the locked position.

In some embodiments, the locking device comprises a rotating bracket; in the locked position, the rotating bracket at least partly surrounds the part of the buggy to retain the buggy to the mounting assembly; and in the unlocked position, the rotating bracket is clear of the part of the buggy to allow the part of the buggy to disengage the locking device.

In some embodiments, the mounting assembly has a first end portion and a second end portion opposite the first end portion; the second portion of each of the at least one sliding rail is disposed at the first end portion of the mounting assembly; and the locking device is disposed at the second end portion of the mounting assembly.

In some embodiments, the buggy frame further comprises a lower cross-member extending transversally to the at least one elongated member at the lower portion of the buggy; and the mounting assembly defines a locking slot that at least partially receives the lower cross-member therein in the loaded position of the buggy to retain the lower portion of the buggy to the mounting assembly.

In some embodiments, the mounting assembly is configured to be removably connected to the vehicle, the mounting assembly further comprising at least one anchor for removably connecting the mounting assembly to an anchor fixture disposed on the vehicle, the anchor fixture selectively retaining the at least one anchor.

In some embodiments, the at least one anchor comprises: a fastener portion configured to be received in an anchor chamber defined at least in part by the anchor fixture, the fastener portion being movable between a locked position and an unlocked position; and an actuator portion operatively connected to the fastener portion, the actuator portion being movable by the user to move the fastener portion between the locked position and the unlocked position, the fastener portion being shaped such that, when the fastener portion is received in the anchor chamber, in the locked position, the fastener portion is retained by the anchor fixture and, in the unlocked position, the fastener portion is removable from the anchor fixture.

In some embodiments, the at least one anchor includes a first anchor and a second anchor; the first anchor is disposed at a first end portion of the mounting assembly; and the second anchor is disposed at a second end portion of the mounting assembly opposite the first end portion.

In some embodiments, the loading system further comprises a winch for moving the buggy onto the mounting assembly and into the loaded position, the winch comprising: a rotatable reel; a line reeled about the reel; and a hook disposed at an end of the line for connecting the winch to the buggy.

In some embodiments, the winch is connected to the mounting assembly.

In some embodiments, the mounting assembly has a first end portion and a second end portion opposite the first end portion; the second portion of each of the at least one sliding rail is disposed at the first end portion of the mounting assembly; and the winch is connected to the second end portion of the mounting assembly.

In some embodiments, the winch is rotatably connected to the mounting assembly, the winch being rotatable between a deployed position and a stowed position; in the deployed position of the winch, the line is reeled onto the reel in a first direction that is generally parallel to the at least one sliding rail of the mounting assembly; and in the stowed position of the winch, the line is reeled onto the reel in a second direction at an angle relative to the first direction.

In some embodiments, the winch is rotated by approximately 90° between the deployed and stowed positions.

In some embodiments, a distance measured, along a direction parallel to the first portion of the at least one sliding rail, between the first end portion of the mounting assembly and a furthest point on the winch from the first end portion of the mounting assembly is greater in the deployed position of the winch than in the stowed position of the winch.

In some embodiments, the winch is manually operated by the user to reel the line about the reel.

In some embodiments, the mounting assembly further comprises: a mounting assembly frame; and a line angle modifier pivotably connected to the mounting assembly frame, the line angle modifier having a line supporting end defining a cam surface; the line angle modifier is pivotable relative to the mounting assembly frame between a lifting position and a resting position; in the lifting position, the line angle modifier extends outward from the mounting assembly frame such that the line is extendable about the cam surface to modify an angle of approach of the line to the buggy; and in the resting position, the line angle modifier lies flat against the mounting assembly frame.

In some embodiments, the buggy frame further comprises a lower cross-member extending transversally to the at least one elongated member at the lower portion of the buggy; and the mounting assembly defines a locking slot that at least partially receives the lower cross-member therein in the loaded position of the buggy to retain the lower portion of the buggy to the mounting assembly.

In some embodiments, the mounting assembly further comprises a tongue configured to interlock with an accessory rack of the vehicle to impede movement of the mounting assembly relative to the vehicle in a direction transverse to the first portion of each of the at least one sliding rail.

According to another aspect of the present technology, there is provided a vehicle comprising: a frame; a plurality of ground-engaging members operatively connected to the frame; a motor supported by the frame and operatively connected to at least one of the ground-engaging members for driving the vehicle; a driver seat supported by the frame; one of a front and a rear cargo portion extending generally horizontally; a mounting assembly connected to the one of the front and the rear cargo portion, the mounting assembly being configured for mounting a buggy onto the vehicle, the mounting assembly comprising: at least one sliding rail configured to slidingly receive at least one elongated member of the buggy to allow the buggy to slide along the at least one sliding rail, each of the at least one sliding rail having a first portion extending generally horizontally and a second portion extending downwardly from the first portion, the second portion being configured to slide the buggy upwards onto the vehicle, the first portion being configured to slide the buggy generally horizontally into a loaded position on the vehicle.

In some embodiments, the at least one sliding rail extends generally laterally such that the mounting assembly is configured to mount the buggy onto the vehicle from an initial position in which the buggy is placed on a lateral side of the vehicle.

In some embodiments, the vehicle further comprises an accessory rack connected to the one of the front and the rear cargo portion, the mounting assembly being positioned atop the accessory rack and being connected to the one of the front and the rear cargo portion of the vehicle via the accessory rack.

In some embodiments, the mounting assembly further comprises a tongue configured to interlock with the accessory rack to impede movement of the mounting assembly relative to the vehicle in a direction transverse to the first portion of each of the at least one sliding rail.

In some embodiments, the accessory rack comprises at least one anchor fixture; and the mounting assembly further comprises at least one anchor removably connecting the mounting assembly to the at least one anchor fixture of the accessory rack, the at least one anchor fixture selectively retaining the at least one anchor.

In some embodiments, the at least one anchor comprises: a fastener portion received in an anchor chamber defined at least in part by the anchor fixture, the fastener portion being movable between a locked position and an unlocked position; and an actuator portion operatively connected to the fastener portion, the actuator portion being movable by the user to move the fastener portion between the locked position and the unlocked position, the fastener portion being shaped such that, when the fastener portion is received in the anchor chamber, in the locked position, the fastener portion is retained by the anchor fixture and, in the unlocked position, the fastener portion is removable from the anchor fixture.

In some embodiments, the at least one anchor includes a first anchor and a second anchor; the first anchor is disposed at a first end portion of the mounting assembly; and the second anchor is disposed at a second end portion of the mounting assembly opposite the first end portion.

In some embodiments, the mounting assembly further comprises a locking device configured to lockingly engage a part of the buggy in the loaded position to retain the buggy to the mounting assembly in the loaded position.

In some embodiments, the locking device is movable between a locked position and an unlocked position, the locking device being biased to be in the locked position.

In some embodiments, the locking device comprises a rotating bracket; in the locked position, the rotating bracket is configured to at least partly surround the part of the buggy to retain the buggy to the mounting assembly; and in the unlocked position, the rotating bracket is configured to clear of the part of the buggy to allow the part of the buggy to disengage the locking device.

In some embodiments, the mounting assembly has a first end portion and a second end portion opposite the first end portion; the second portion of each of the at least one sliding rail is disposed at the first end portion of the mounting assembly; and the locking device is disposed at the second end portion of the mounting assembly.

In some embodiments, the mounting assembly defines a locking slot configured to at least partially receive a lower cross-member of the buggy therein in the loaded position of the buggy to retain a lower portion of the buggy to the mounting assembly.

In some embodiments, the vehicle further comprises a winch for moving the buggy onto the mounting assembly and into the loaded position, the winch comprising: a rotatable reel; a line reeled about the reel; and a hook disposed at an end of the line for connecting the winch to the buggy.

In some embodiments, the winch is connected to the mounting assembly.

In some embodiments, the mounting assembly has a first end portion and a second end portion opposite the first end portion; the second portion of each of the at least one sliding rail is disposed at the first end portion of the mounting assembly; and the winch is connected to the second end portion of the mounting assembly.

In some embodiments, the winch is rotatably connected to the mounting assembly, the winch being rotatable between a deployed position and a stowed position; in the deployed position of the winch, the line is reeled onto the reel in a first direction that is generally parallel to the at least one sliding rail of the mounting assembly; and in the stowed position of the winch, the line is reeled onto the reel in a second direction at an angle relative to the first direction.

In some embodiments, the winch is rotated by approximately 90° between the deployed and stowed positions.

In some embodiments, a distance measured, along a direction parallel to the first portion of the at least one sliding rail, between the first end portion of the mounting assembly and a furthest point on the winch from the first end portion of the mounting assembly is greater in the deployed position of the winch than in the stowed position of the winch.

In some embodiments, the winch is manually operated by the user to reel the line about the reel.

In some embodiments, the mounting assembly further comprises: a mounting assembly frame; and a line angle modifier pivotably connected to the mounting assembly frame, the line angle modifier having a line supporting end defining a cam surface; the line angle modifier is pivotable relative to the mounting assembly frame between a lifting position and a resting position; in the lifting position, the line angle modifier extends upward such that the line is extendable about the cam surface to modify an angle of approach of the line to the buggy; and in the resting position, the line angle modifier lies flat against the mounting assembly frame.

In some embodiments, the mounting assembly defines a locking slot that at least partially receives a lower cross-member of the buggy therein in the loaded position of the buggy to retain a lower portion of the buggy to the mounting assembly.

In some embodiments, the one of the front and the rear cargo portion is the rear cargo portion, the rear cargo portion extending rearwardly of the driver seat.

In some embodiments, in the loaded position of the buggy, the buggy is positioned rearward of the driver seat.

In some embodiments, in the loaded position of the buggy, the buggy is positioned such that a center of gravity of cargo disposed on the buggy is disposed rearward of the driver seat.

In some embodiments, in the loaded position of the buggy, a majority of the buggy is disposed laterally between the wheels of the vehicle.

In some embodiments, the buggy comprises at least one wheel for rolling the buggy on a ground surface, the at least one wheel being rotatable about a buggy wheel rotation axis; and in the loaded position of the buggy, the buggy wheel rotation axis extends longitudinally along the vehicle.

In some embodiments, the buggy comprises a first wheel and a second wheel for rolling the buggy on a ground surface; and in the loaded position of the buggy, a longitudinal distance from the first wheel to the driver seat is greater than a longitudinal distance from the second wheel to the driver seat.

In some embodiments, in the loaded position of the buggy, the buggy wheel rotation axis is disposed within a width of the vehicle.

In some embodiments, the driver seat is a straddle seat.

In some embodiments, the vehicle is an off-road vehicle.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 is a perspective view of the buggy of FIG. 1A taken from a lower portion of the buggy;

DETAILED DESCRIPTION

The present technology will be described with reference to a four-wheeled straddle-seat all-terrain vehicle (ATV) 10. However, it is contemplated that aspects of the present technology could be used in other types of off-road vehicles such as side-by-side vehicles (SSVs), dune buggies, and the like, or also in road vehicles.

Figure 1A:
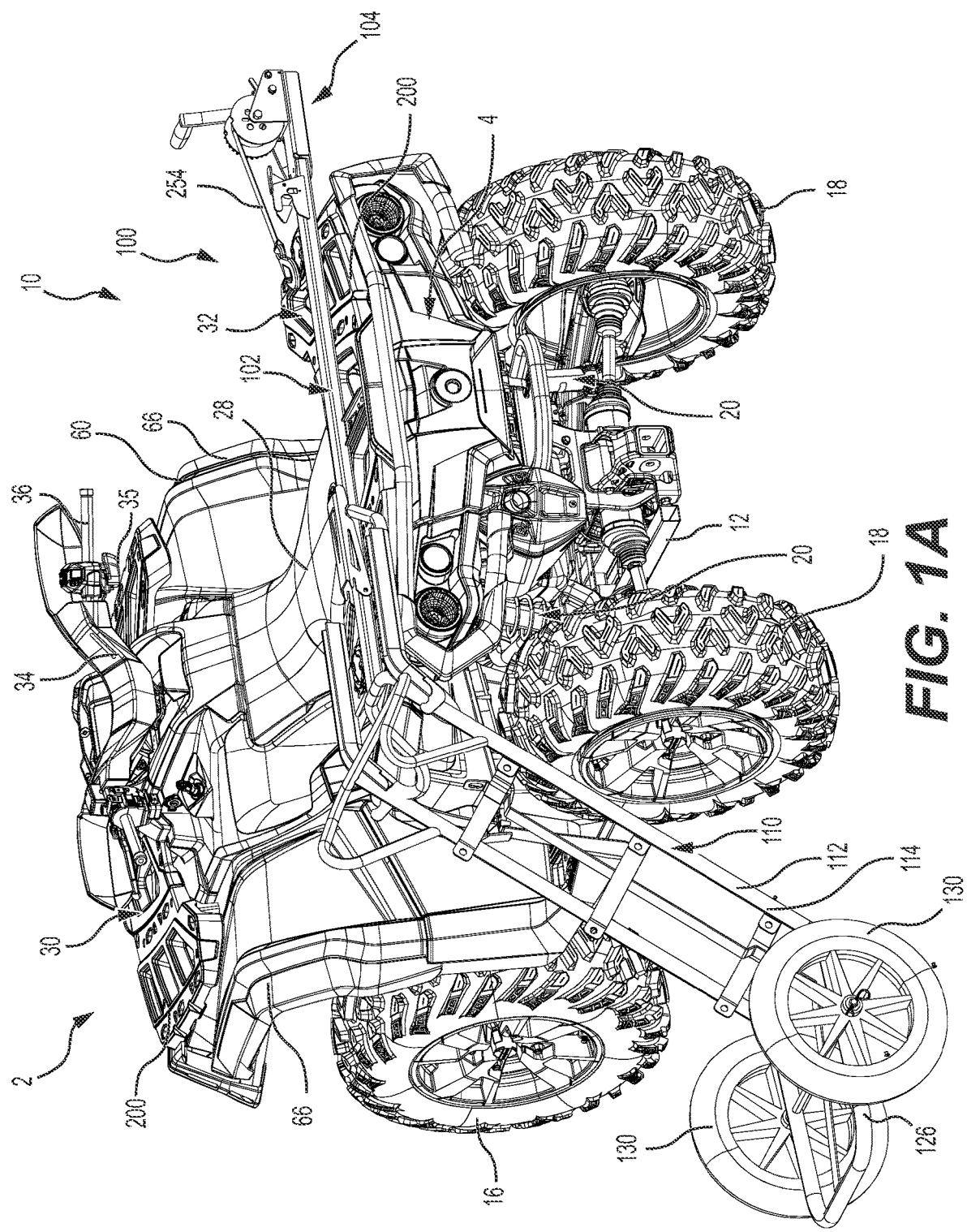
FIG. 1A is a perspective view, taken from a top, rear, left side, of an all-terrain vehicle (ATV) having a loading system according to an embodiment of the present technology, with a buggy of the loading system shown in an initial position on the ground.

As shown in FIG. 1A, and as will be described in detail below, the ATV 10 is provided with a loading system 100 for loading cargo 105 (see FIGS. 1B to 2A) onto the ATV 10, namely via a buggy 110 configured for transporting cargo 105. The buggy 110 may also be referred to as a "dolly" or a "hand truck". The loading system 100 particularly facilitates the loading of heavy cargo onto the ATV 10 which would otherwise be difficult to load and secure to the ATV 10. As will be appreciated, the cargo 105 can be different types of cargo in different examples. For instance, as illustrated, the cargo 105 may be a bag, however the cargo 105 may be other types of cargo, such as hunted game, storage boxes, or any other suitable type of cargo.

With reference to FIGS. 1A to 2B, the ATV 10 has a front end 2 and a rear end 4 defined consistently with a forward travel direction of the ATV 10. The ATV 10 has a frame 12 to which a vehicle body is mounted. A pair of front wheels 16 is suspended from a front portion of the frame 12 via front suspension assemblies (not shown). A pair of rear wheels 18 is suspended from a rear portion of the frame 12 via rear suspension assemblies 20. It is contemplated that the vehicle 10 could be a vehicle having ground-engaging members other than wheels in other embodiments (e.g., an ATV equipped with track assemblies).

Figure 2A:
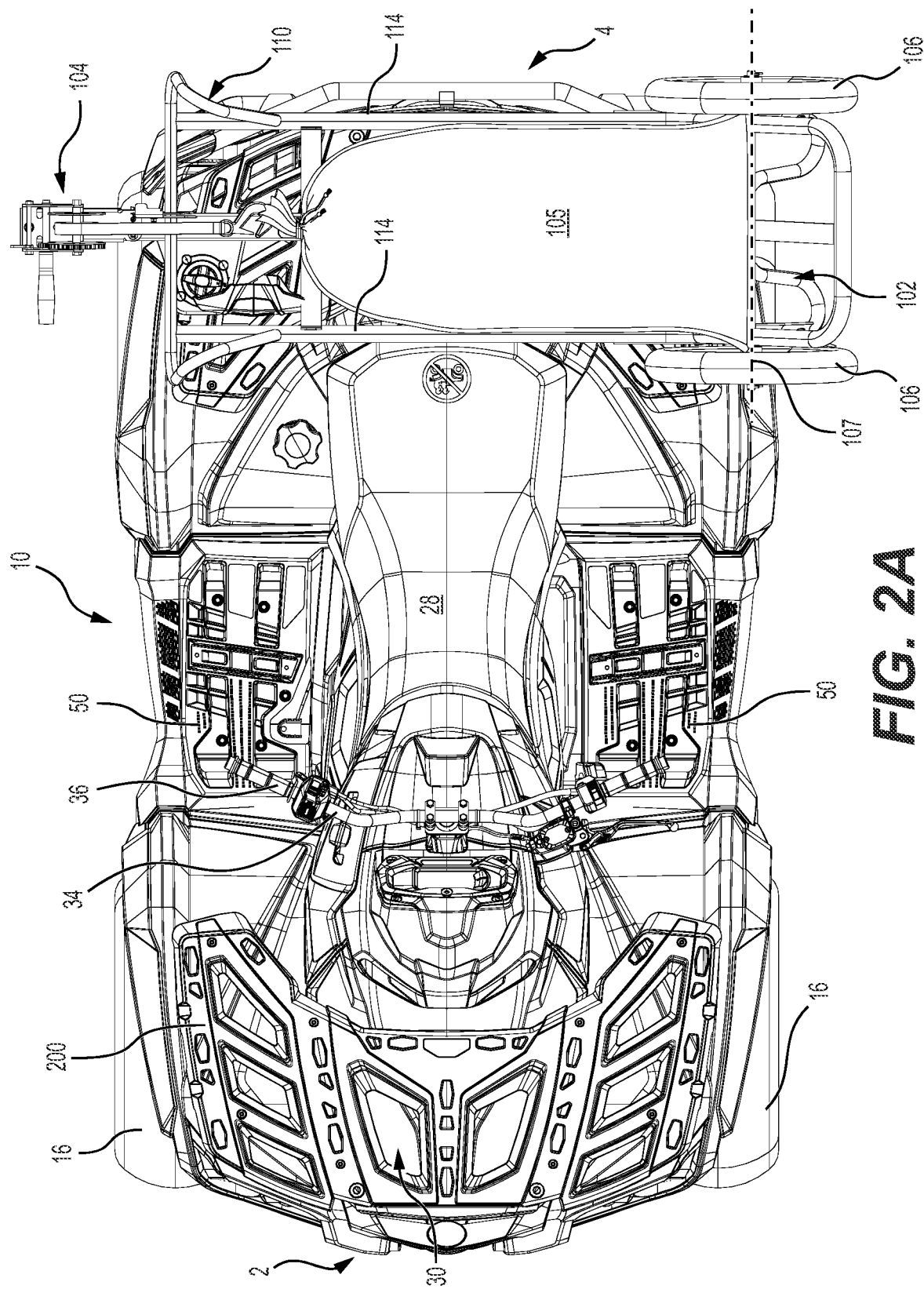
FIG. 2A is top plan view of the vehicle of FIG. 1A, showing the buggy in the loaded position on the vehicle.
Figure 2B:
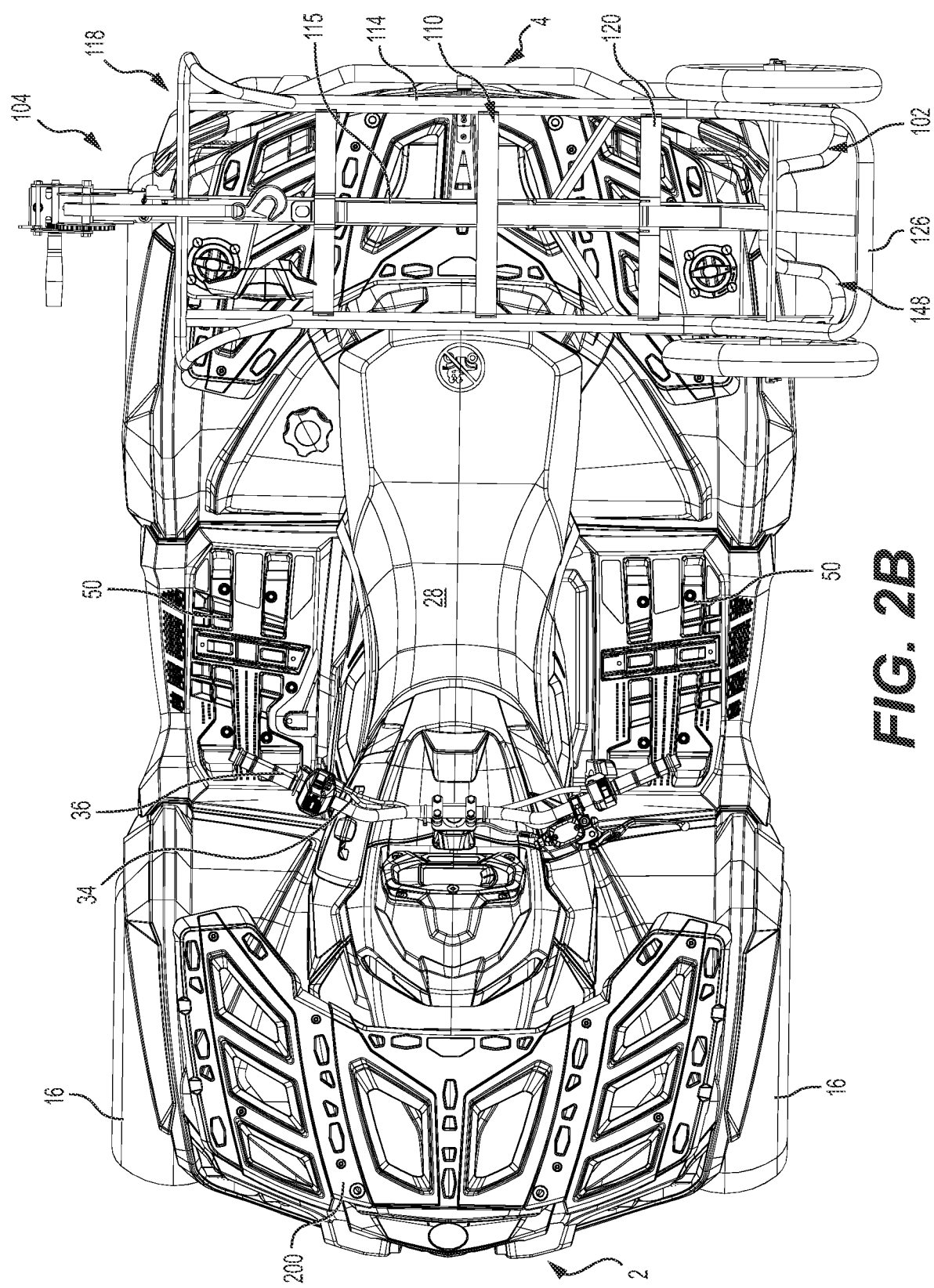
FIG. 2B is a top plan view of the vehicle of FIG. 1A, showing the buggy in the loading position with cargo removed therefrom to expose the buggy.
Figure 4:
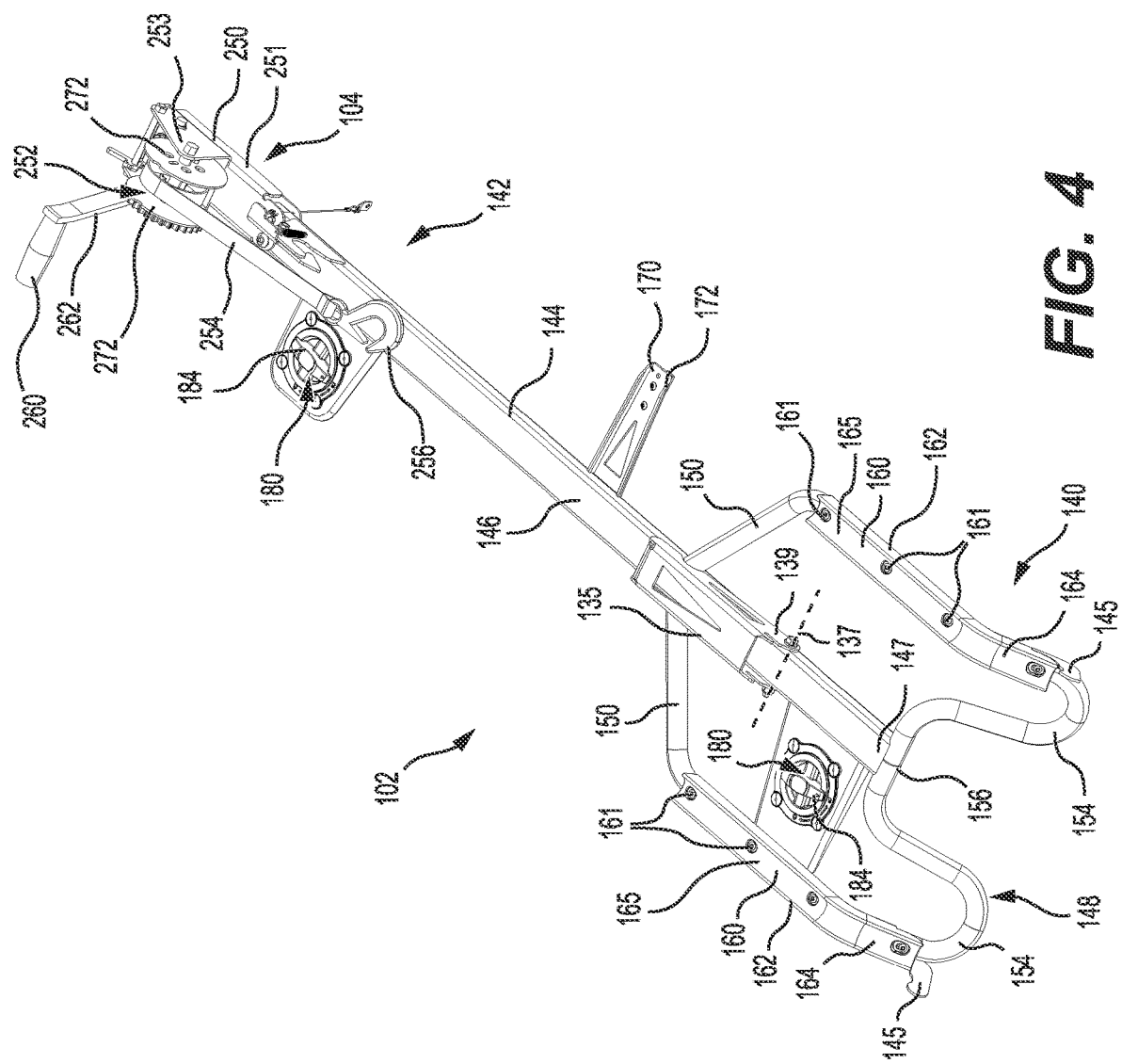
FIG. 4 is a perspective view, taken from a top, rear, left side, of a mounting assembly and a winch of the loading system of FIG. 1A, showing the winch in a deployed position.

The ATV 10 also includes fairings 60 including a front fascia (not shown) at the front end 2 of the ATV 10 and several side panels 64 extending over lateral sides of the ATV 10. A fender 66 is disposed over each wheel well overarching the wheels 16, 18 to protect the driver and/or passenger from dirt, water and other debris being projected by the wheels 16, 18. The ATV 10 further includes a straddle-type driver seat 28 mounted to the frame 12 for accommodating a driver of the ATV 10. As best shown in FIG. 2A, driver footrests 50 are provided on either side of the driver seat 28 and are disposed vertically lower than the driver seat 28 to support the driver's feet. Another straddle-type passenger seat may be provided behind the driver seat 28 to accommodate a passenger.

In this embodiment, the ATV 10 has a front cargo portion 30 and a rear cargo portion 32 for supporting cargo thereon. Notably, each of the front and rear cargo portions 30, 32 define generally horizontal support surfaces upon which cargo can be placed. For instance, the front cargo portion 30 may be defined by a surface of the front fascia of the fairings 60 at the front end 2 of the ATV 10, while the rear cargo portion 34 may be defined by a surface of a rear fascia of the fairings 60 at the rear end 4 of the ATV 10. The front cargo portion 30 is disposed forwardly of the driver seat 28, while the rear cargo portion 32 is disposed rearwardly of the driver seat 28.

A steering assembly 34 is rotationally supported by the frame 12 to enable a driver to steer the ATV 10. The steering assembly 34 includes a handlebar assembly including a handlebar 36 connected to a steering column (not shown) for actuating steering linkages operably connected to the left and right front wheels 16. In this embodiment, the steering assembly 34 includes a power steering electric motor mounted to the steering column for facilitating steering. The power steering electric motor is operatively connected to the steering column and to the left and right front wheels 16 via the steering linkages.

As shown in FIG. 1A, a throttle operator 35 in the form of a thumb-actuated throttle lever is provided near the right end of the handlebar 36. Other types of throttle operators, such as a finger-actuated throttle lever and a twist grip, are also contemplated. The throttle operator 35 is selectively actuated by the driver of the ATV 10 to request throttle from the engine. More specifically, a throttle operator position sensor (not shown) is operatively connected to the throttle operator 35 to sense movement thereof caused by the driver in operation. The sensed input from the throttle operator position sensor is transmitted to an electronic control unit (ECU) (not shown) which controls operation of the ATV's motor 40.

A motor 40 (schematically shown in FIG. 1C) is mounted to a middle portion of the frame 12 and, as will be described in greater detail below, is operatively connected to the front and rear wheels 16, 18 in order to propel the ATV 10. In this embodiment, the motor 40 is an internal combustion engine and will therefore be referred to hereinafter as an engine 40. In this embodiment, the engine 40 is a V-type engine having two cylinders. The cylinders are disposed at an angle to each other. Each cylinder has an intake port (not shown) connected to an air induction system delivering air into the engine 40. Each cylinder has a fuel injector injecting fuel into the engine 40 and a spark plug igniting the fuel-air mixture to initiate the combustion cycle. Each cylinder has an exhaust port connected to an exhaust manifold through which the exhaust gases are removed from the engine 40. It is contemplated that other types of internal combustion engine could be used, such as, for example, an inline engine. It is also contemplated that the engine 40 could have more than two cylinders.

The engine air induction system feeds air to the engine 40 in a known manner and will thus not be described in detail here. Notably, a throttle valve is controlled by the ECU to adjust the air being fed to the engine 40 in response to input by the driver at the throttle operator 35.

It is contemplated that the engine 40 could instead be a different type of motor in other embodiments. For example, in some embodiments, the engine 40 could instead be an electric motor, in which case the engine air induction or air exhaust systems may be omitted.

A powertrain of the ATV 10 operatively connects the front and rear wheels 16, 18 to the engine 40. The powertrain notably includes the engine 40, a continuously variably transmission (CVT) and a transmission. An output shaft of the engine 40 is connected to the CVT which is in turn connected to the transmission.

The ATV 10 can be operated in a rear-wheel drive mode (i.e., a two-wheel drive mode) in which the rear wheels 18 are driven by the engine 40 or in a four-wheel drive mode in which the front and rear wheels 16, 18 are driven by the engine 40. To that end, in this embodiment, the transmission is selectively connected to the front wheels 16 via a drive mode coupler. The drive mode coupler is controlled by the ECU and is selectively actuated to cause the ATV 10 to change from the two-wheel drive mode configuration to the four-wheel drive mode configuration by selectively coupling the front wheels 16 to the transmission for selectively driving the front wheels 16. Such drive mode couplers are known in the art and will thus not be described in detail herein.

The selection between the drive modes is made by the driver using a drive mode switch provided in the vicinity of the driver of the ATV 10. In this embodiment, the drive mode switch is a toggle switch mounted on a dashboard of the ATV 10.

It is contemplated that, in some embodiments, only the front or the rear wheels 16, 18 may be operatively connected to the engine 40 such that only the front or the rear wheels 16, 18 are driven by the engine 40.

The loading system 100 will now be described in greater detail. As shown in FIG. 1A, the loading system 100 includes the buggy 110, as well as a mounting assembly 102 and a winch 104 that are connected to the ATV 10. As will be described below, the mounting assembly 102 and the winch 104 interact with the buggy 110 for loading the buggy 110 onto the ATV 10. Notably, the loading system 100 is provided to move the buggy 110 from an initial position, shown in FIG. 1A, in which the buggy 110 is positioned on the ground, to a loaded position on the ATV 10, shown in FIGS. 1C to 2B, in which the buggy 110 is supported by the ATV 10.

The buggy 110 will now be described with reference to FIG. 3. The buggy 110 has a buggy frame 112 including two side elongated members 114 and a central elongated member 115 extending generally parallel to one another from a lower portion 116 of the buggy 110 to an upper portion 118 of the buggy 110. In this embodiment, the side elongated members 114 are generally tubular and have an annular cross-sectional profile such that the outer surface of each of the side elongated members 114 is curved. When the buggy 110 is upright and at rest on a horizontal ground surface, the elongated members 114 extend generally vertically. The buggy frame 112 also has three cross-members 120 extending between the side elongated members 110. Notably, the cross-members 120 are connected at their ends to the side elongated members 114, and at a middle portion to the central elongated member 115. The central elongated member 115 has an attachment portion 117 disposed at an upper end of the central elongated member 115. The attachment portion 117 is configured for attaching the buggy 110 to the winch 104, as will be described in detail below. To that end, the attachment portion 117 defines an opening 119. In this embodiment, the central elongated member 115 has a raised portion 121 that extends between an upper one of the cross-members 120 and a lower one of the cross-members 120. As will be explained in more detail below, the raised portion 121 is provided to accommodate the buggy 110 on the mounting assembly 102 when the buggy 110 is in the loaded position on the ATV 10.

A handle 122 is disposed at the upper portion 118 of the buggy 110 for handling by a user. In this embodiment, the handle 122 includes a transversal portion 123 extending between the upper ends of the side elongated members 114 and two curved portions 124 extending from opposite ends of the transversal portion 123. The two curved portions 124 are connected to the side elongated members 114 at their other end.

The side elongated members 114 and the central elongated member 115 are curved at the lower portion 116 of the buggy 110 to form a lower platform 126 for supporting the cargo 105. The lower platform 126 may have a plate member in some embodiments to provide a greater surface are to support the cargo 105. Furthermore, two wheels 106 are rotatably connected to the buggy frame 110 at the lower portion 116 for rolling the buggy 110 on the ground surface. Notably, the wheels 106 are disposed on either side of the lower platform 126 such that the lower platform 126 is disposed between the two wheels 106. The wheels 106 are rotatable about a buggy wheel rotation axis 107 that extends generally parallel to the cross-members 120.

In use, the buggy 110 facilitates the transport of cargo 105 along generally short distances. The cargo 105 is supported by the lower platform 126 and is secured to the buggy 110 by one or more straps 109 (FIG. 1B) that can be tied to the buggy 110 in any suitable way. For instance, straps may be received through the ends of the cross-members 120.

The mounting assembly 102 is configured for loading the buggy 110 onto the ATV 10 and, in this embodiment, is connected to the rear cargo portion 32 of the ATV 10 via an accessory rack 200. Notably, as shown in FIG. 1A, the ATV 10 has a front accessory rack 200 disposed at the front cargo portion 30 and a rear accessory rack 200 disposed at the rear cargo portion 32. The front and rear accessory racks 200 are fastened to the front and rear cargo portions 30, 32. In this embodiment, the mounting assembly 102 is connected to the rear accessory rack 200. However, the mounting assembly 102 could be connected to the front accessory rack 200 in other embodiments.

Figure 5:
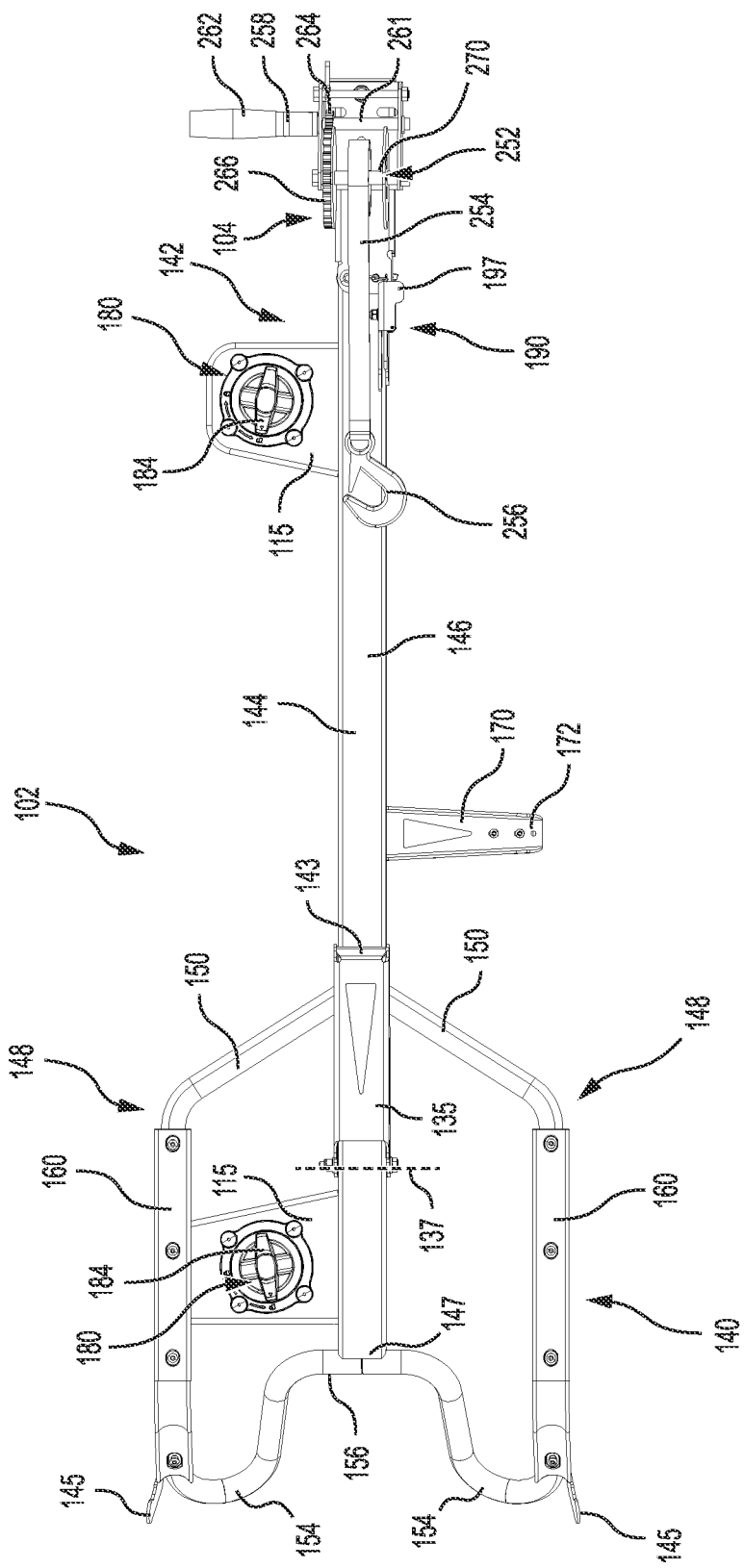
FIG. 5 is a top plan view of the mounting assembly and winch of FIG. 4.

With reference to FIG. 5, the mounting assembly 102 has opposite end portions 140, 142 which, in this embodiment, can be referred to as a left end portion 140 and a right end portion 142 given the orientation of the mounting assembly 102 on the ATV 10. The mounting assembly 102 has a mounting assembly frame 144 which includes a main elongated member 146 extending from the left end portion 140 to the right end portion 142. The main elongated member 146 is tubular and has a generally rectangular cross-sectional profile. A loading support portion 148 of the frame 144 is connected to the main elongated member 146 and includes a plurality of tubular members interconnected to one another. In this embodiment, the loading support portion 148 is symmetrical about a plane parallel to the main elongated member 146.

Figure 6:
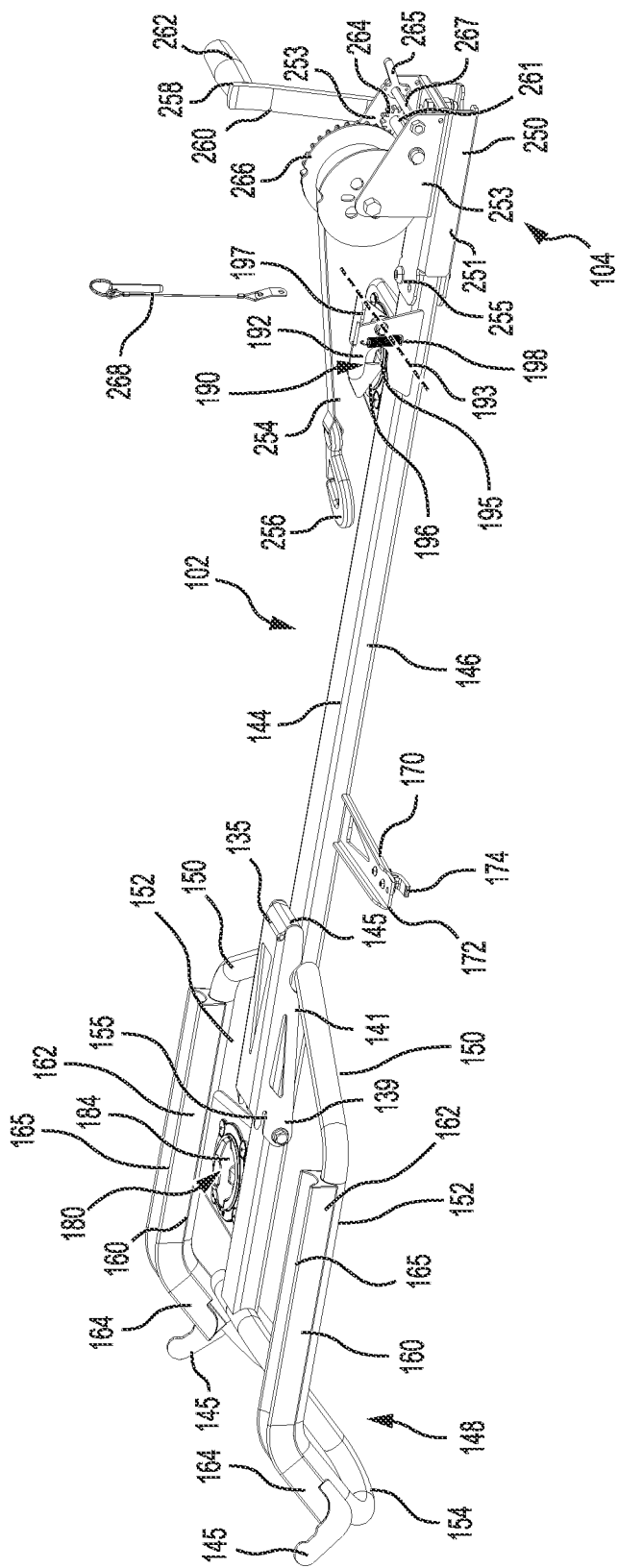
FIG. 6 is a perspective view, taken from top, rear, right side, of the mounting assembly and winch of FIG. 4, with the winch shown in the deployed position and a locking pin shown removed from the winch.

The loading support portion 148 includes front and rear angled sections 150 extending from a front side and a rear side of the main elongated member 146 respectively, at a same point along a length of the main elongated member 146. The front angled section 150 extends forward and leftward from the main elongated member 146, while the rear angled section 150 extends rearward and leftward from the main elongated member 146. As shown in FIG. 6, front and rear straight sections 152 extend from the front and rear angled sections 150 respectively, generally parallel to the main elongated member 146. The angled sections 150, the straight sections 152 and the main elongated member 146 extend generally along a same plane. Two downwardly-extending U-shaped sections 154 extend from the front and rear straight sections 152 respectively. The U-shaped sections 154 are connected to one another by a central section 156 that is connected to a left end 147 of the main elongated member 146.

In this embodiment, the mounting assembly 102 also has two guiding members 145, namely front and rear guiding members 145, for guiding positioning of the buggy 110 relative to the mounting assembly 102 in the initial position of the buggy 110. The front and rear guiding members 145 are disposed at the left end portion 140 of the mounting assembly 102 and are respectively connected to the front and rear U-shaped sections 154 of the mounting assembly frame 144. In use, the buggy 110 is positioned such that the side elongated members 114 are disposed between the two guiding members 145.

The mounting assembly 102 has two sliding rails 160 that are configured to slidingly receive the buggy 110 as will be explained below. The sliding rails 160 are connected to the loading support portion 148 of the frame 144 on an upper side thereof. Specifically, each sliding rail 160 is connected to a corresponding one of the straight sections 152 and part of a corresponding one of the U-shaped sections 154. Each sliding rail 160 has a horizontal portion 162 that, in this embodiment, extends generally laterally along the ATV 10, and an angled portion 164 that extends downwardly from the horizontal portion 162. The horizontal portion 162 of each sliding rail 160 is connected to the corresponding straight section 152 while the angled portion 164 is connected to the corresponding U-shaped section 154. In this embodiment, the angled portion 164 extends at approximately 40° relative to the horizontal portion 162. The angled portion 164 may extend at different angles from the horizontal portion 162 in other embodiments.

The sliding rails 160 are shaped to receive the side elongated members 114 of the buggy 110. Notably, as best shown in FIG. 6, in this embodiment, each sliding rail 160 has a concave curved upper surface 165 and a concave curved lower surface (not shown). The curved upper surface 165 allows the sliding rail 160 to receive the side elongated members 114 of the buggy 110. It is contemplated that, in other embodiments, the buggy 110 may have a single elongated member such as the side elongated members 114 in which a single sliding rail 160 may be provided on the mounting assembly 102.

As shown in FIGS. 4 to 7, the mounting assembly 102 has a line angle modifier 135 pivotably connected to the main elongated member 146. The line angle modifier 135 is configured to engage a line 254 of the winch 104, as will be explained in more detail below. The line angle modifier 135 is pivotable about a longitudinal axis 137 (i.e., transversal to the direction of the main elongated member 146) between a lifting position (FIGS. 1A, 1B, 11) and a resting position (FIGS. 4 to 7). In the lifting position, the line angle modifier 135 extends outward, namely upward, from the mounting assembly frame 144. Conversely, in the resting position, the line angle modifier 135 lies flat against the mounting assembly frame 144, namely the main elongated member 146.

In this embodiment, the line angle modifier 135 has a generally C-shaped cross-sectional profile and has two flanges 139 at an end thereof that are pivotably connected to the main elongated member 146 (on opposite sides thereof). The line angle modifier 135 has two opposite side walls 141 that extend from respective ones of the flanges 139. An end of the line angle modifier 135 opposite the flanges 139 defines a cam surface 143 configured to engage the line 254 of the winch 104. As will be explained in detail below, positioning the line angle modifier 135 in the lifting position facilitates lifting of the buggy 110 onto the mounting assembly 102.

Furthermore, in this embodiment, the line angle modifier 135 defines a locking slot 155 that is configured to receive a lower one of the cross-members 120 of the buggy 110 (at the lower portion 116 of the buggy 110) when the buggy 110 is in the loaded position on the ATV 10 and the line angle modifier 135 is in the resting position. Notably, when the lower cross-member 120 is received in the locking slot 155, the lower portion 116 of the buggy 110 is retained to the mounting assembly 102 to limit rattling of the lower portion 116 of the buggy 110 on the mounting assembly 102.

It is contemplated that the line angle modifier 135 may be omitted in other embodiments (e.g., in embodiments in which the winch 104 is a powered winch). The locking slot 155 may be defined by another member of the mounting assembly 102 in such embodiments or may also be omitted.

As best shown in FIG. 6, the mounting assembly 102 also has a locking device 190 for lockingly engaging a part of the buggy 110 when the buggy 110 is in the loaded position so as to retain the buggy 110 to the mounting assembly 102 in the loaded position. In particular, as will be explained in detail below, the locking device 190 lockingly engages the handle 122 of the buggy 110 and therefore retains the upper portion 118 of the buggy 110 to the mounting assembly 102 in the loaded position of the buggy 110. The locking device 190 is movable between a locked position and an unlocked position. In this embodiment, the locking device 190 is biased to be in the locked position.

In this embodiment, the locking device 190 includes a rotating bracket 192 that is rotatably connected to the main elongated member 146 near the right end portion 142 of the mounting assembly 102. More specifically, the rotating bracket 192 is rotatably connected to the main elongated member 146 via a fixed bracket 194 of the locking device 190 which is fastened to a rear surface of the main elongated member 146. The rotating bracket 192 is thus rotatable about a locking axis 193 extending transversally to the main elongated member 146. In both the locked and unlocked positions of the locking device 190, the rotating bracket 192 extends upward from the fixed bracket 194. The rotating bracket 192 has a cam portion 196 defining a slanted surface that interacts with the handle 122 of the buggy 110 when the buggy 110 is slid into engagement with the locking device 190.

As show in FIG. 6, in the locked position, the rotating bracket 192 and the fixed bracket 194 define a recess 195 that is shaped to receive the handle 122 of the buggy 110 so that the rotating bracket 192 at least partly surrounds the handle 122 to retain the buggy 110 to the mounting assembly 102. Conversely, in the unlocked position, the rotating bracket 192 is clear of the handle 122 of the buggy 110 to allow the handle 122 to disengage the locking device 190.

In this embodiment, in order to bias the locking device 190 to be in the locked position, the locking device 190 also has a spring 198 connected between the rotating bracket 192 and the fixed bracket 194. Other suitable biasing members could be used instead of the spring 198 in other embodiments. Furthermore, an actuating bracket 197 is connected to the rotating bracket 192 and has an upper surface which can be pressed down on by the user to move the locking device 190, namely the rotating bracket 192, from the locked position to the unlocked position by countering the force applied by the spring 198 on the rotating bracket 192.

The winch 104 is provided for moving the buggy onto the mounting assembly 102 and into the loaded position on the ATV 10. With reference to FIGS. 4 to 7, in this embodiment, the winch 104 is connected to the mounting assembly 102 and thus could be said to be part of the mounting assembly 102. In particular, the winch 104 is connected to a right end 149 of the main elongated member 146. While in this embodiment the winch 104 is connected to the mounting assembly 102, it is contemplated that, in other embodiments, the winch 104 could be separately connected to the ATV 10.

Figure 7:
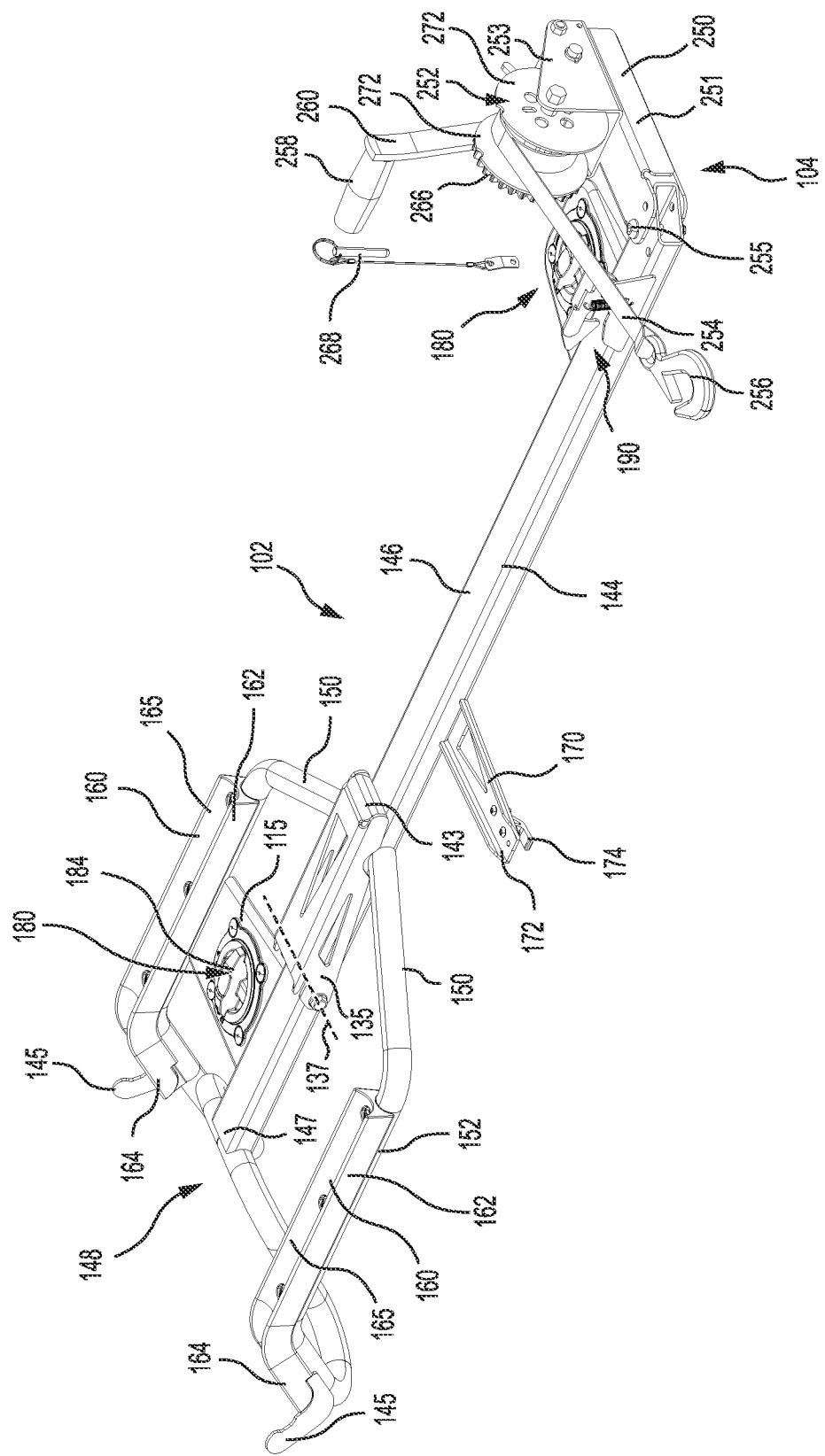
FIG. 7 is a perspective view, taken from a top, rear, right side, of the mounting assembly and winch of FIG. 6, with the winch shown in a stowed position and the locking pin shown removed from the winch.

The winch 104 has a support body 250 and a rotatable reel 252 connected to the support body 250. As shown in FIGS. 6 and 7, the support body 250 includes a lower elongated member 251 and two upper flanges 253 extending upwardly from the lower elongated member 251. The lower elongated member 251 is rotatably connected to the right end 149 of the main elongated member 146 via a pivot formed by a fastener 255 that extends through respective openings of the support body 250 and the main elongated member 146. The fastener 255 (in this example a bolt) is threadedly received by another fastener, namely a nut, to secure the support body 250 to the main elongated member 146.

As shown in FIG. 5, the reel 252 has a shaft 270 and two side plates 272 connected to the shaft 270. A line 254 is reeled about the shaft 270 of the reel 252 between the two side plates 272. By operation of the winch 104, the line 254 can be selectively wound around the reel 252 or unwound from the reel 252. In this embodiment, the line 254 is a strap. A hook 256 is connected to a free end of the line 254 for connecting the winch 104 to the buggy 110 as will be described in greater detail below.

In this embodiment, the winch 104 is manually operated by the user to reel the line 254 about the reel 252. Notably, with reference to FIG. 6, the winch 104 has a crank 258 that is operable by the user to rotate the reel 252 and thereby reel the line 254 about the reel 252. The crank 258 includes a lever arm 260 and a handle 262 connected to an end of the lever arm 260. The handle 262 is configured for grasping by the user to operate the winch 104. An opposite end of the lever arm 260 (opposite the end to which the handle 262 is connected) is connected to a shaft 261 that is rotatably supported by the parallel upper flanges 253. The crank 258 is thus rotatable about the axis of the shaft 261. A driving gear 264 is mounted to the shaft 261 and is meshed with a driven gear 266 mounted to the shaft 270 of the reel 252. As such, rotation of the crank 258 drives the reel 252. As best shown in FIG. 6, in this embodiment, the winch 104 also has a drive lock 265 mounted to a fixed shaft 267 that is connected to the two upper flanges 253. The drive lock 265 is pivotable about the shaft 267 to a locking position in which the drive lock 265 blocks motion of the driven gear 266 in a direction in which the line 254 unreels form the reel 252.

It is contemplated that, in other embodiments, the winch 104 could be a powered winch. For instance, the winch 104 could have an electric motor powering rotation of the reel 252 instead of the crank 258.

In this embodiment, the winch 104 is rotatable about a generally vertical axis defined by the fastener 255 between a deployed position (FIGS. 4 to 6) and a stowed position (FIG. 7) and is secured in the selected position. In this embodiment, the winch 104 is rotated by approximately 90° between the deployed and stowed positions. Notably, in the deployed position, the line 254 is reeled onto the reel 252 in a first direction generally parallel to the sliding rails 160 of the mounting assembly 102 (i.e., in the lateral direction of the ATV 10). While the winch 104 is not meant to be operated in the stowed position (i.e., the line 254 reeled or unreeled), as can be seen in FIG. 7, if the user were to reel the line 254 in the stowed position, the line 254 would be reeled onto the reel 252 in a second direction at an angle relative to the first direction (i.e., in the longitudinal direction of the ATV 10). As will be appreciated, a distance measured along a direction parallel to the sliding rails 160 (i.e., laterally) between the left end portion 140 of the mounting assembly 102 and a furthest point on the winch 104 from the left end portion 140 is greater in the deployed position than in the stowed position. The winch 104 is secured in either of the deployed position and the stowed position by a locking pin 268 that is inserted through corresponding openings in the lower elongated member 251 of the winch 104 and the main elongated member 146. Notably, the openings of the lower elongated member 251 are aligned with different openings of the main elongated member 146 in the deployed position and in the stowed position.

Providing the stowed position for the winch 104 allows the loading system 100 to take up less space on the ATV 10, namely reducing a width thereof. This can make driving the ATV 10 easier as the driver does not have to account for as much increased width of the ATV 10 as is the case when the winch 104 is in the deployed position. Moreover, this may prevent the winch 104 from getting damaged, namely as it might otherwise bump into an obstacle the driver did not correctly circumnavigate.

It is contemplated that, in other embodiments, the winch 104 could be fixed (i.e., not rotatable).

Figure 8:
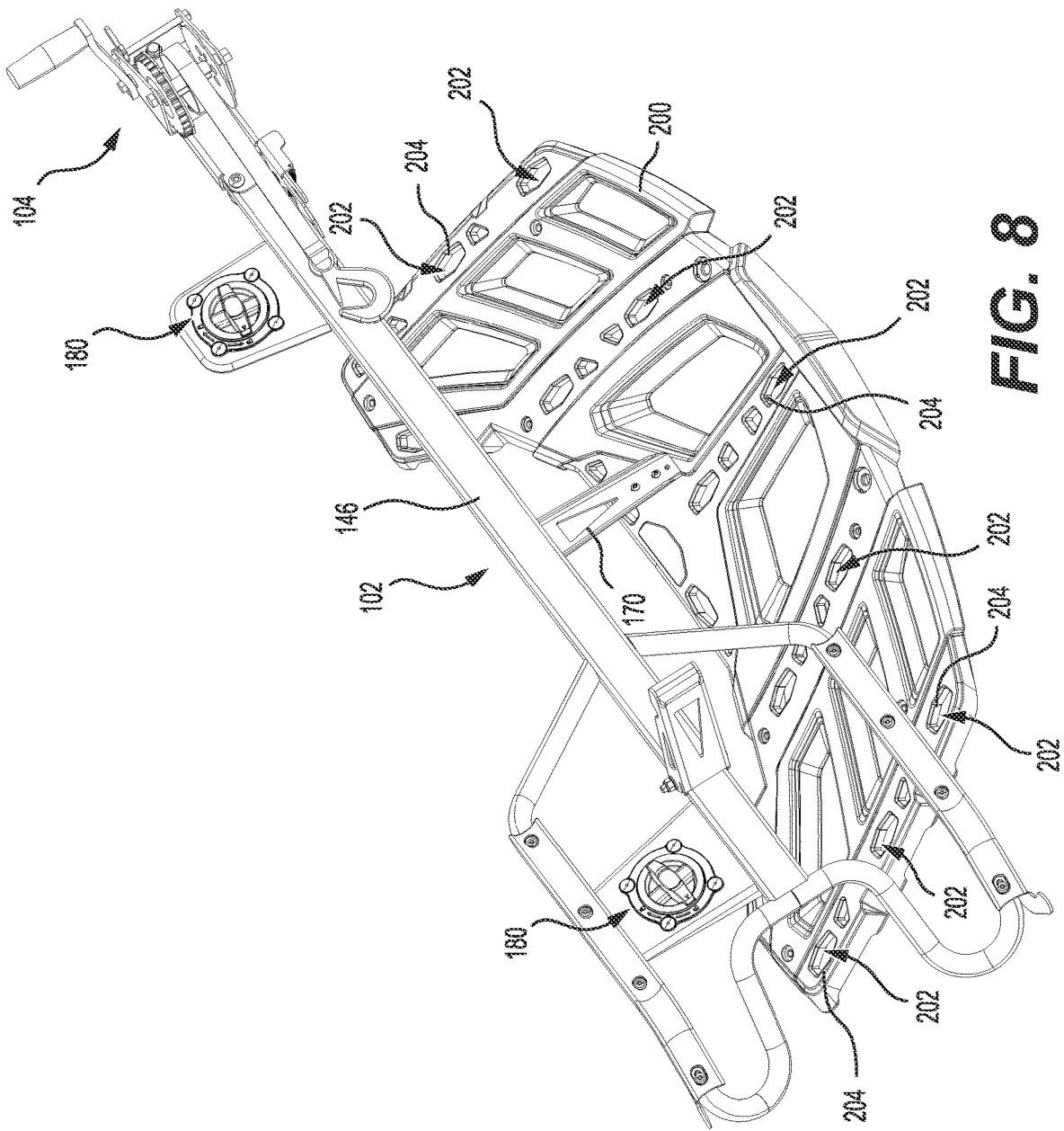
FIG. 8 is a perspective view, taken from a top, rear, left side, of the mounting assembly of FIG. 4 and a rear accessory rack of the vehicle, showing the mounting assembly being installed on the rear accessory rack.

The mounting assembly 102 is configured to be removably connected to the ATV 10. To that end, as shown in FIGS. 4 to 7, the mounting assembly 102 has two anchors 180 for removably connecting the mounting assembly 102 to respective anchor fixtures 202 of the rear accessory rack 200. Notably, as best shown in FIG. 8, the accessory rack 200 defines a plurality of such anchor fixtures 202 to which anchors 180 can be secured in order to secure accessories or other equipment to the ATV 10. Anchors and anchor fixtures of this type are described in detail in U.S. Pat. No. 9,751,592, issued Sep. 5, 2017, the entirety of which is incorporated herein by reference. A brief description of the anchors 180 and anchor fixtures 202 will therefore be provided herein.

Figure 14:
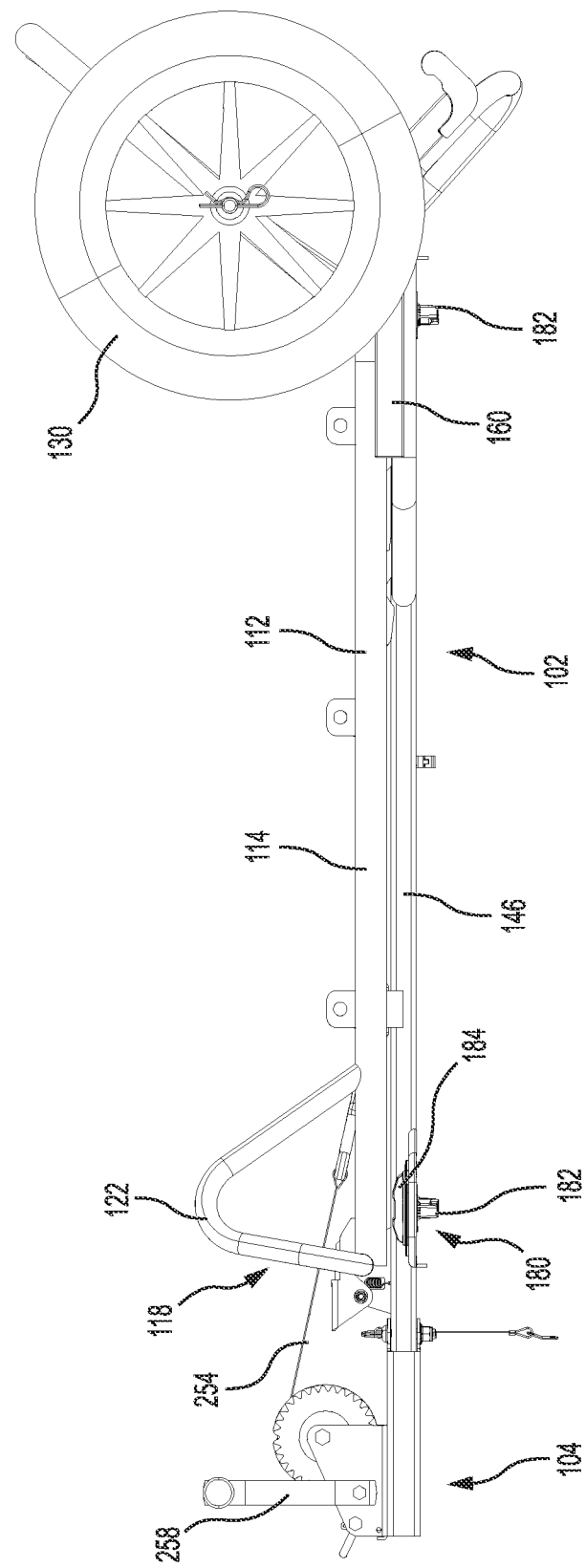
FIG. 14 is a front elevation view of the mounting assembly and the buggy, showing the buggy in the loaded position.

In this embodiment, the two anchors 180 are disposed at the left and right end portions 140, 142 of the mounting assembly 102 respectively. Notably, the mounting assembly 102 has left and right plates 115 to which the respective anchors 180 are connected. As shown in FIG. 14, each anchor 180 has a fastener portion 182 and an actuator portion 184 operatively connected to the fastener portion 182. The fastener portion 182 is configured to be received in an anchor chamber (not shown) defined in part by the corresponding anchor fixture 202 of the accessory rack 200. The fastener portion 182 is movable between locked and unlocked positions. Notably, the actuator portion 184 is movable by a user to move the fastener portion 182 between the locked and unlocked positions thereof.

The fastener portion 182 is shaped such that, when the fastener portion 182 is received in the anchor chamber defined by the corresponding anchor fixture 202, in the unlocked position, the fastener portion 182 is removable from the anchor fixture 202. Notably, an opening 204 of the anchor fixture 202, which opens into the anchor chamber, has a hexagonal shape which allows the similarly hexagonally-shaped fastener portion 182 to be removed therethrough in the unlocked position. Similarly, the fastener portion 182 is insertable into the anchor chamber of the anchor fixture 202 in the unlocked position. Conversely, when the fastener portion 182 is rotated in the anchor chamber defined by the corresponding anchor fixture 202, to the locked position, the fastener portion 182 is retained by the anchor fixture 202 of the rear accessory rack 200 as the fastener portion 182 is not aligned with the opening of the anchor fixture 202 and therefore cannot be removed therethrough.

In this embodiment, the mounting assembly 102 also has a tongue 170 that extends rearwardly from a rear edge of the main elongated member 146. The tongue 170 is configured to engage the accessory rack 200 in order to limit movement of the mounting assembly 102 relative to the accessory rack 200. The tongue 170 is disposed between the left and right end portions 140, 142 of the mounting assembly 102. The tongue 170 has an upper tongue member 172 and a lower tongue member 174 that extends downward from the upper tongue member 172. A portion of the lower tongue member 174 is parallel to the upper tongue member 172. The manner in which the tongue member 170 engages the accessory rack 200 will be described below.

Figure 9:
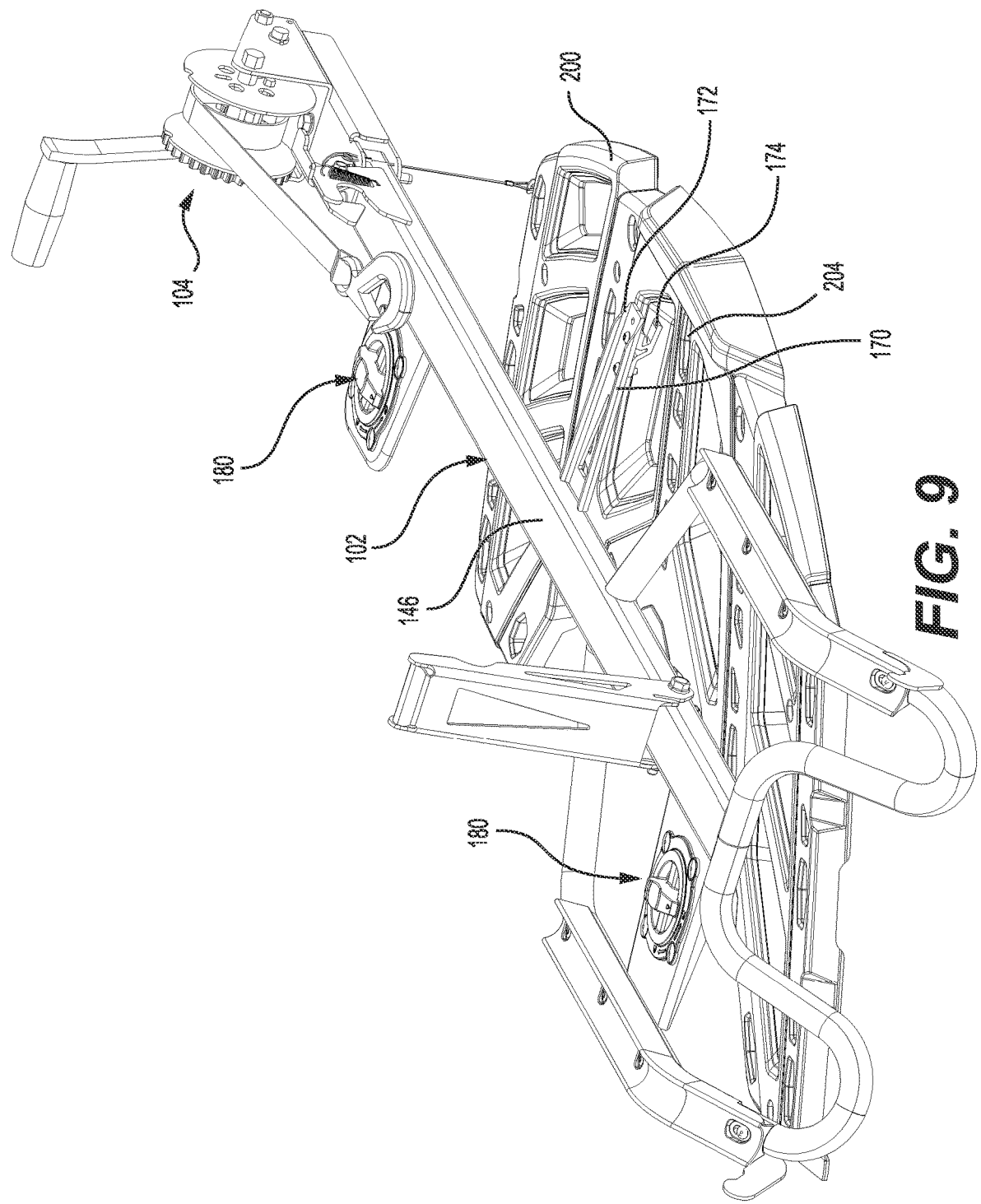
FIG. 9 is a perspective view, taken from a top, rear, left side, of the mounting assembly of FIG. 4, showing the mounting assembly being installed on the rear accessory rack as the mounting assembly is approached closer to the rear accessory rack.
Figure 10:
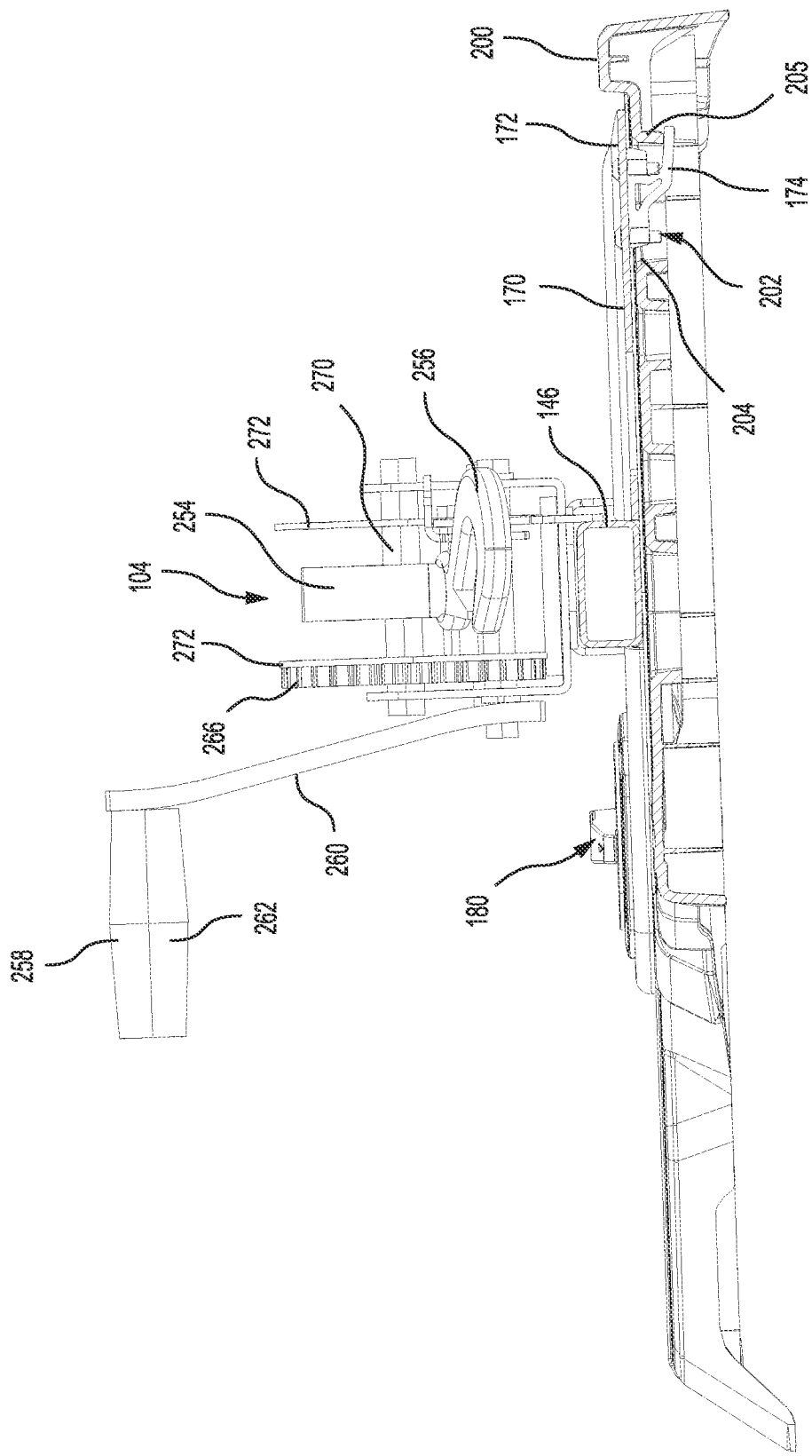
FIG. 10 is a cross-sectional view, taken along a longitudinal plane, of the mounting assembly and the rear accessory rack.

The manner in which the mounting assembly 102 is connected to the accessory rack 200, and thus to the ATV 10, is illustrated in FIGS. 8 to 10. As can be seen in FIG. 8, initially, the mounting assembly 102 (and the winch 104 if connected thereto) is approached to a rear portion of the accessory rack 200 at an angle such that the tongue 170 is pointed downwardly and rearwardly. As shown in FIG. 9, the tongue 170 is more particularly approached to a middle anchor fixture 202 disposed around a middle of the accessory rack 200 (about halfway between the left and right ends of the accessory rack 200) at a rear portion of the accessory rack 200. As shown in FIG. 10, the tongue 170 is partly inserted into the opening 204 of the middle anchor fixture 202 and the mounting assembly 102 is lowered to be in a horizontal position such that the two anchors 180 are received in respective anchor fixtures 202. Notably, the lower tongue member 174 is inserted into the anchor chamber defined by the middle anchor fixture 202 and the upper tongue member 172 remains in contact with an upper surface of the accessory rack 200. As such, the upper and lower tongue members 172, 174 are spaced apart by a side wall 205 (FIG. 10) of the middle anchor fixture 204. In this manner, the tongue 170 is interlocked with the accessory rack 200 to impede movement of the mounting assembly 102 relative to the accessory rack 200 (and thus to the ATV 10) in the longitudinal direction (i.e., a direction transverse to the horizontal portion 162 of the sliding rails 160), particularly rearwardly. Once the tongue 170 is interlocked with the accessory rack 200, the mounting assembly 102 is secured to the accessory rack 200 by actuating the anchors 180 of the mounting assembly 102 as described above.

The procedure for loading the buggy 110 onto the ATV 10 will now be described in detail with reference to FIGS. 1A to 1C and 11 to 15. First, the buggy 110 supporting the cargo 105 is placed in the initial position illustrated in FIGS. 1A and 11, whereby the buggy 110 is on a lateral side of the ATV 10, namely the left side of the ATV 10, and is longitudinally aligned with the mounting assembly 102. The user can guide the buggy 110 into the initial position via the two guiding members 145 of the mounting assembly 102, notably placing the buggy 110 between the two guiding members 145. In its initial position, the buggy 110 is leaned toward the ATV 10 such that the buggy 110 is partly supported by the loading support portion 148 of the frame 144 of the mounting assembly 102. In particular, the side elongated members 114 of the buggy 110 sit against and are received by the angled portions 164 of the two sliding rails 160.

Figure 11:
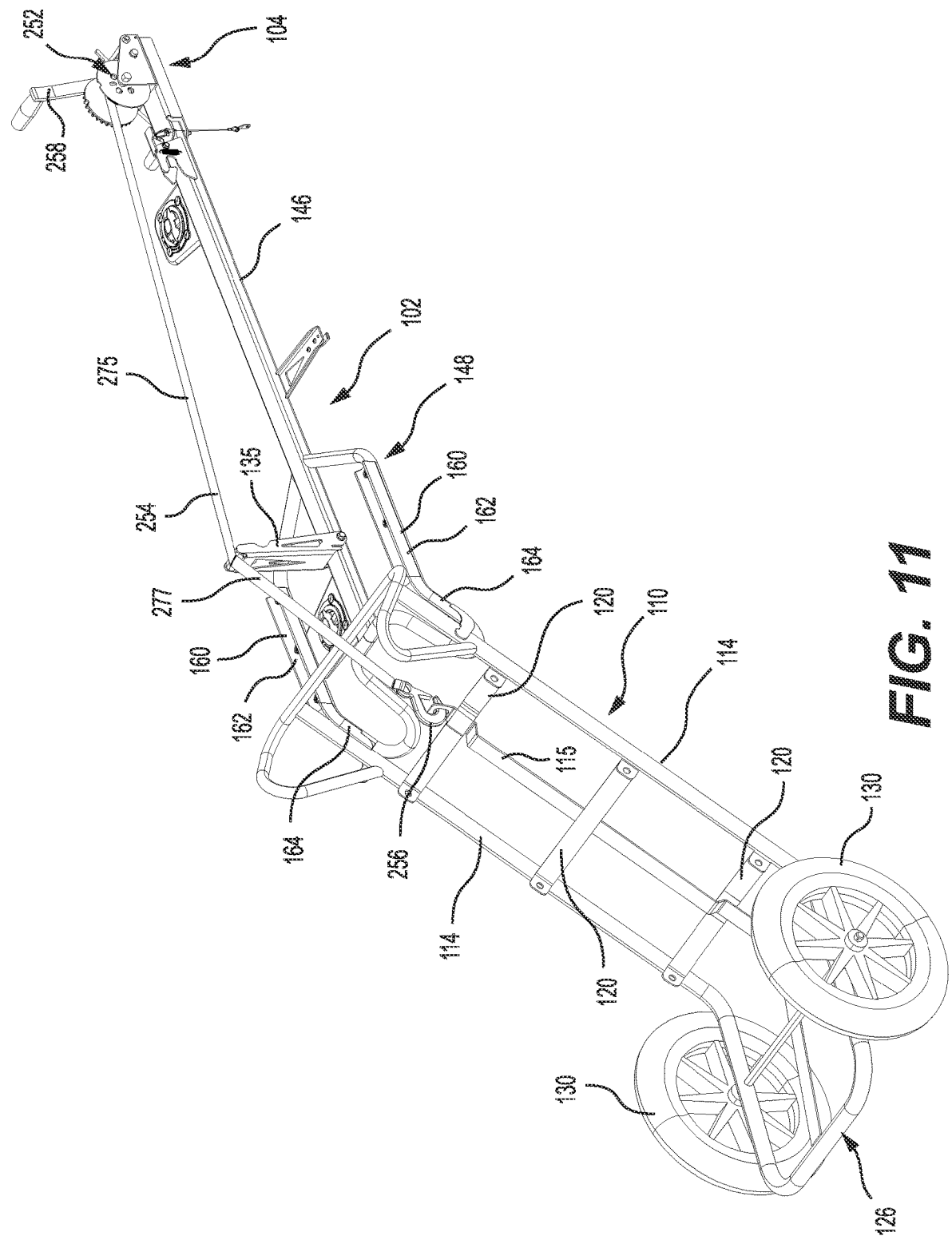
FIG. 11 is a perspective view, taken from a top, rear, left side, of the mounting assembly and the buggy, showing the buggy in the initial position.

Once the buggy 110 is in the initial position, the winch 104 can be connected to the buggy 110. To do this, in this embodiment, the user pivots the line angle modifier 135 to the lifting position, as shown in FIG. 11, and the line 254 of the winch 104 is then pulled over the line angle modifier 135 such that the line 254 engages the cam surface 143 of the line angle modifier 135 and the hook 256 is then connected to the attachment portion 117 of the buggy 110 by being inserted through the opening 119 thereof. As can be seen, the engagement of the line 254 with the cam surface 143 modifies an angle of approach of the line 254 to the buggy 110. Notably, as shown in FIG. 11, two differently angled portions 275, 277 of the line 254 can be observed. The first angled portion 275 of the line 254 extends upward and leftward from the reel 252 of the winch 104 to the cam surface 143 of the line angle modifier 135, while the second angled portion 277 of the line 254 extends downward and leftward from the cam surface 243 to the buggy 110. The downward angle of approach of the second angled portion 277 facilitates lifting the buggy 110 onto the mounting assembly 102, namely providing a more favorable directionality to the force to be exerted on the line 254 when lifting the buggy 110 which results in a reduced torque requirement on the crank 258 than if the angle of approach of the line 254 were not modified.

Figure 1B:
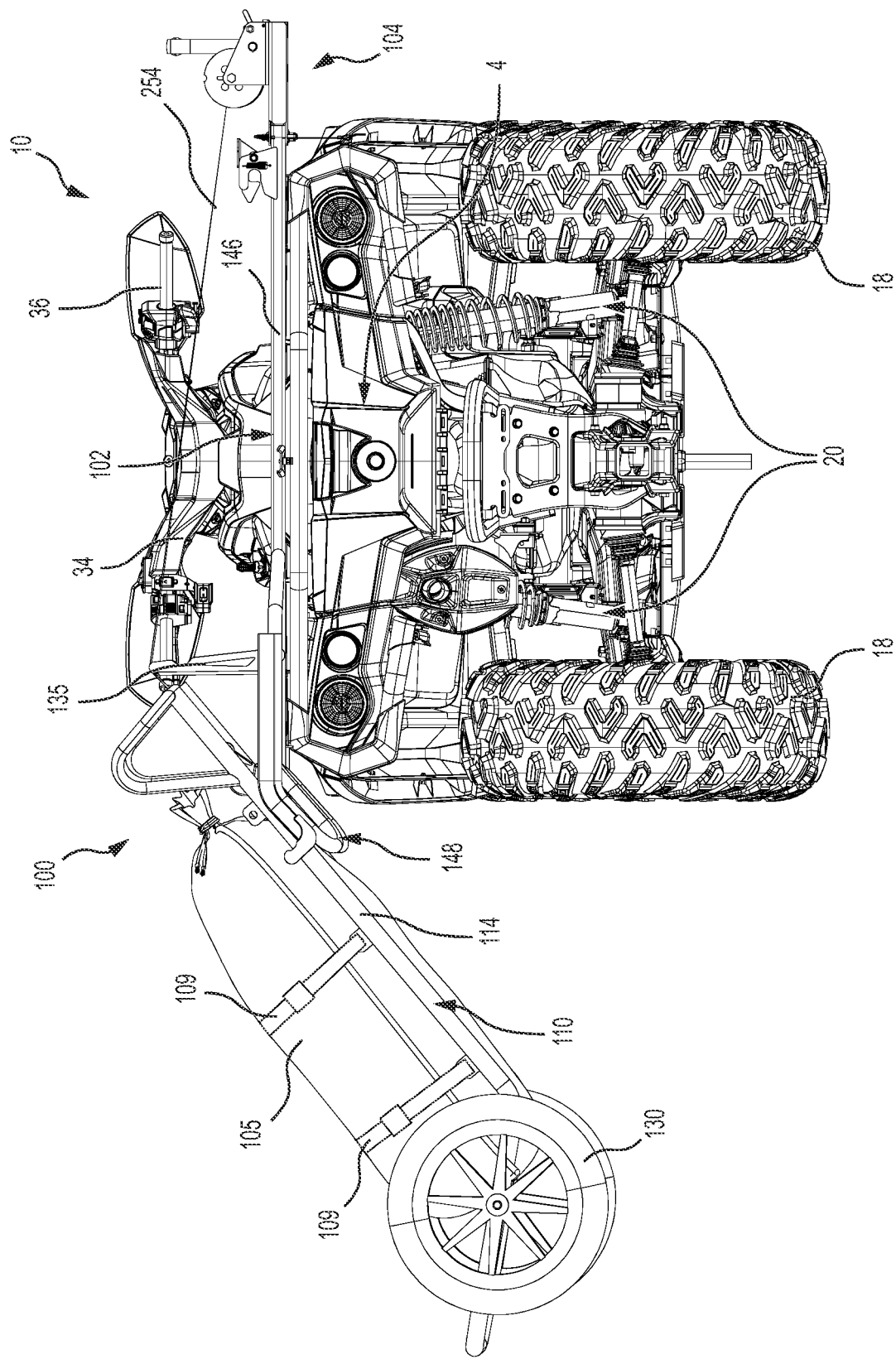
FIG. 1B is a rear elevation view of the vehicle of FIG. 1A, showing the buggy lifted off the ground in an intermediate position.
Figure 1C:
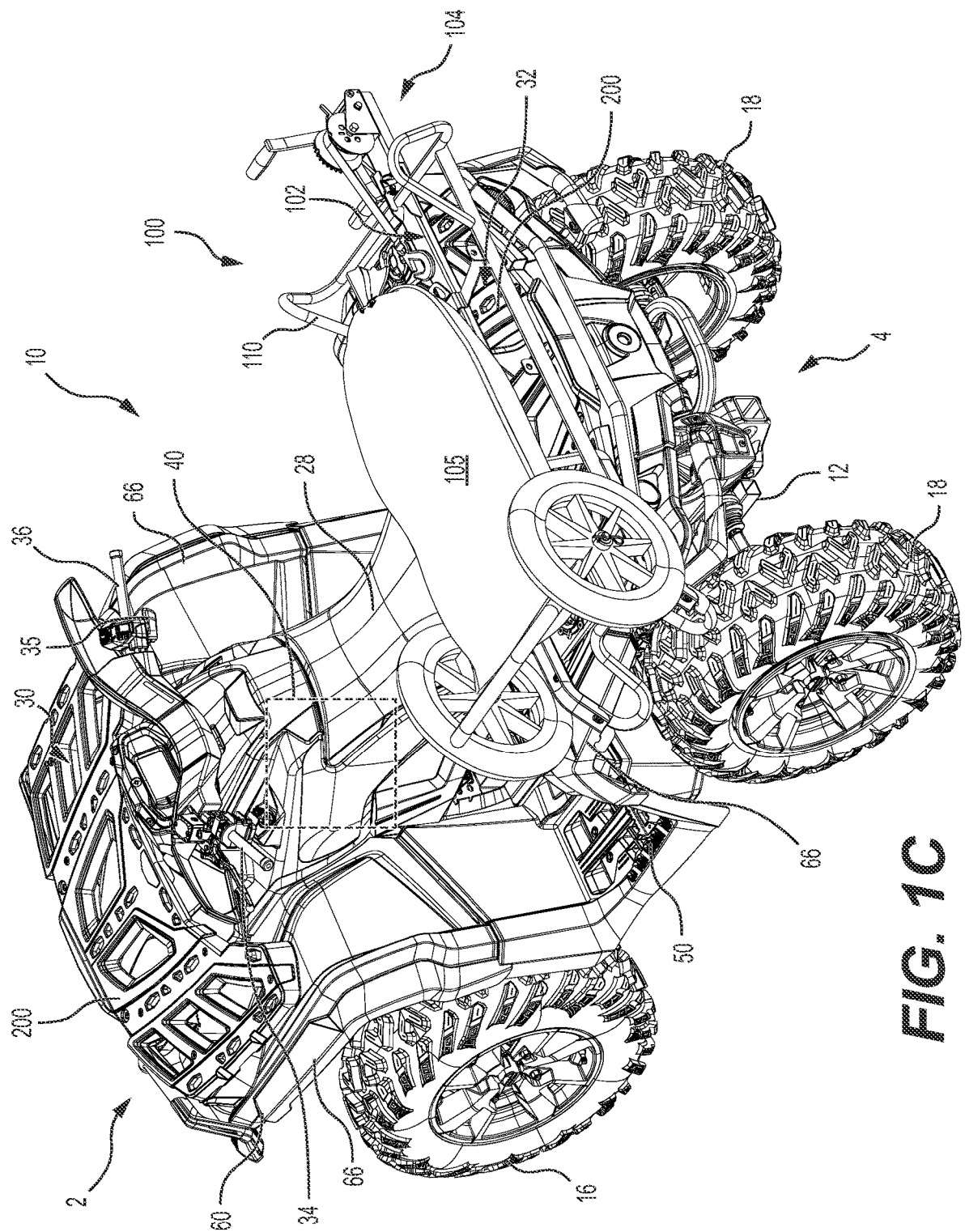
FIG. 1C is a perspective view, taken from a top, rear, left side, of the vehicle of FIG. 1A, with the buggy shown in a loaded position on the vehicle.
Figure 12:
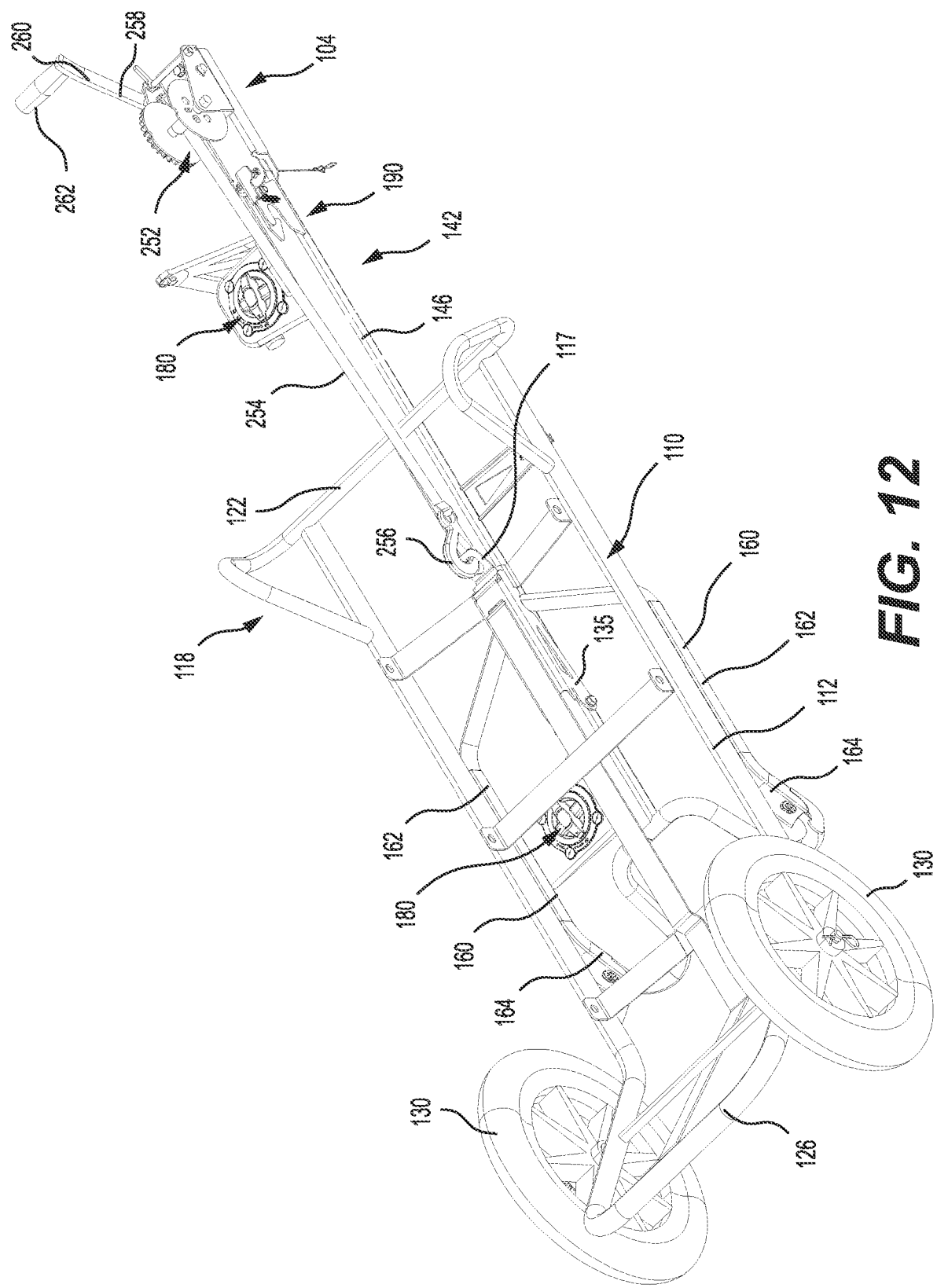
FIG. 12 is a perspective view, taken from a top, rear, left side, of the mounting assembly and the buggy, showing the buggy in a horizontal position on the mounting assembly.
Figure 13:
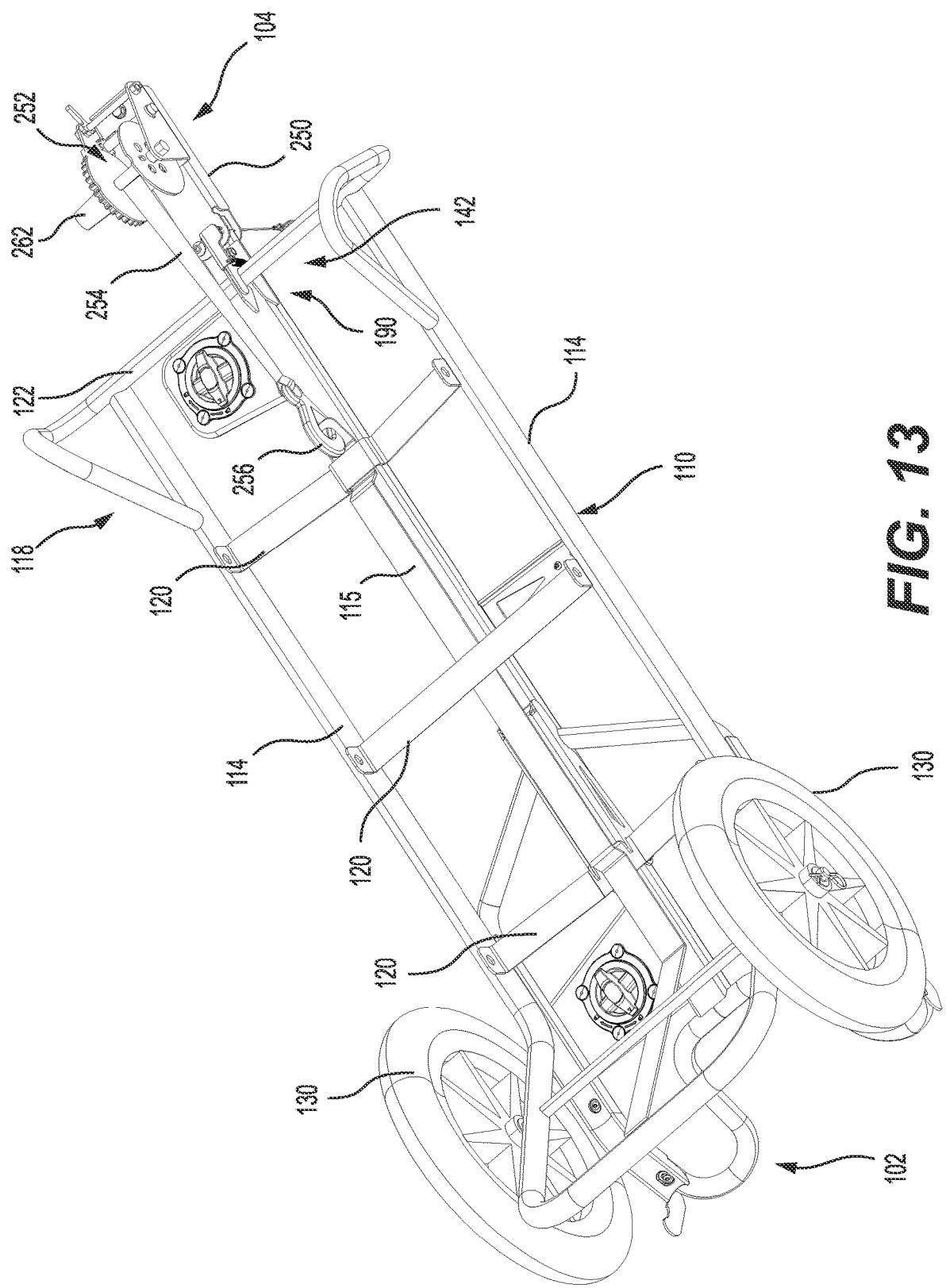
FIG. 13 is a perspective view, taken from a top, rear, left side, of the mounting assembly and the buggy, showing the buggy in the loaded position.

The user then operates the winch 104 by rotating the crank 258 to reel the line 254 onto the reel 252. As shown in FIG. 1B, this lifts the buggy 110 off the ground as the side elongated members 114 of the buggy 110 slide against the angled portions 164 of the slide rails 160 such that the buggy 110 slides upward onto the ATV 10. As the user continues to reel the buggy 110 onto the ATV 10, at a given point, the buggy 110 will have moved laterally inward enough such that a center of gravity of the buggy 110 (and cargo 105 tied thereto) will cause the buggy 110 to tilt down and acquire a horizontal position as illustrated in FIG. 12. In this intermediate horizontal position, the side elongated members 114 of the buggy 110 are no longer engaging the angled portions 164 of the slide rails 160 and are instead received by the horizontal portions 162 of the slide rails 160 such that the buggy 110 can slide along the horizontal portions 162 into the loaded position. Moreover, as can be seen in FIG. 12, the line angle modifier 135 will pivot downward to its resting position due to the buggy 110 tilting onto the line angle modifier 135. The user then continues reeling the buggy 110 such that the upper portion 118 of the buggy 110 approaches the right end portion 142 of the mounting assembly 102.

Figure 15:
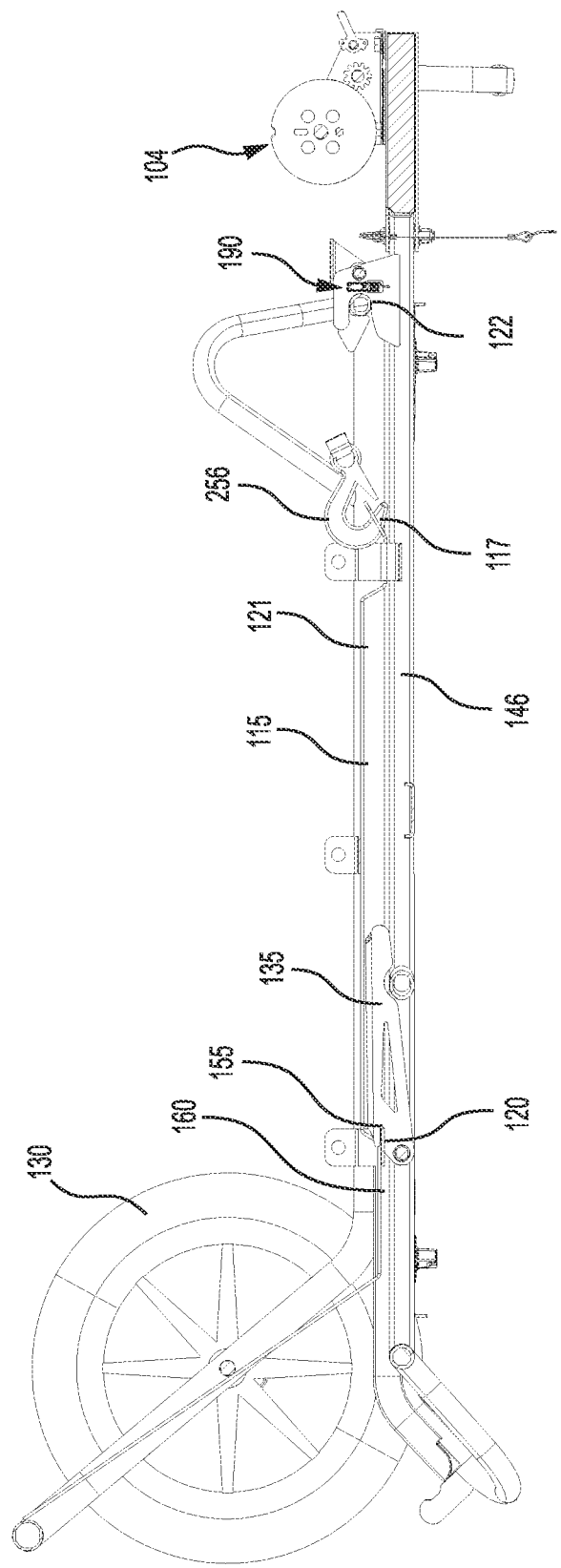
FIG. 15 is a cross-sectional view, taken along a lateral plane, of the mounting assembly and the buggy, showing the buggy in the loaded position.

The buggy 110 then reaches the loaded position on the ATV 10, as illustrated in FIGS. 1C to 2B and 13 to 15. As can be seen, in this embodiment, in the loaded position, the handle 122 of the buggy 110 is received by the locking device 190 which, as described above, retains the upper portion 118 of the buggy 110 to the mounting assembly 102. In particular, the rotating bracket 192 surrounds part of the handle 122 such that the handle 122 cannot be removed from the locking device 190 without purposeful actuation of the locking device 190 to the unlocked position. At the same time, in this embodiment, as best shown in FIG. 15, the lower cross-member 120 of the buggy 110 slides into the locking slot 155 defined by the line angle modifier 135 such that the lower portion 116 of the buggy 110 is retained to the mounting assembly 102. As can be seen in FIG. 15, the raised portion 121 of the central elongated member 115 is disposed above the line angle modifier 135 such that the line angle modifier 135 does not lift the buggy 110 off the sliding rails 160.

In some cases, the buggy 110 may not be placed in the initial position before connecting the winch 104 thereto. That is, the buggy 110 could be distanced from the mounting assembly 102 and pulled toward the mounting assembly 102 by the winch 104. For instance, the buggy 110 could be positioned lying on the ground and the cargo 105 subsequently tied thereto. Instead of manually lifting the buggy 110 to be upright and placing it in the initial position as described above, the winch 104 can be connected to the buggy 110 while the buggy 110 lies on the ground. The winch 104 is then operated to lift the buggy 110 to be upright and approaching it to the mounting assembly 102 to proceed with the procedure as descried above. This may be useful for example in cases where the cargo 105 is particularly heavy.

As will be appreciated from the above description, the loading system 100 provides a convenient and efficient manner in which cargo 105 can be loaded onto the ATV 10. Notably, this considerably reduces the physical exertion that would otherwise be needed to mount heavy cargo on the ATV 10, which can allow a user to mount heavy cargo 105 onto the ATV 10 without help from another person. It is to be understood that the loading system 100 does not exempt the user from respecting a manufacturer's suggested payload capacity for the ATV 10 or associated accessory components (e.g., the accessory rack 200). Moreover, the loading system 100 can be useful in different applications in which heavy objects need to be lifted onto a vehicle. While the loading system 100 has been described and illustrated herein in the context of the ATV 10, it is to be understood that different types of vehicles may beneficially implement the loading system 100. Furthermore, while the loading system 100 has been illustrated in a particular configuration on the ATV 10, the loading system 100 may have different configurations on other vehicles. For instance, in some vehicles in which a cargo bed is provided, the loading system 100 may be implemented such that the mounting assembly 102 is oriented differently, namely longitudinally (such that the main elongated member 146 and the sliding rails 160 extend generally longitudinally along the vehicle). In such cases, the initial position of the buggy 110 would be on a longitudinal side of the vehicle (e.g., behind the vehicle).

Figure 16:
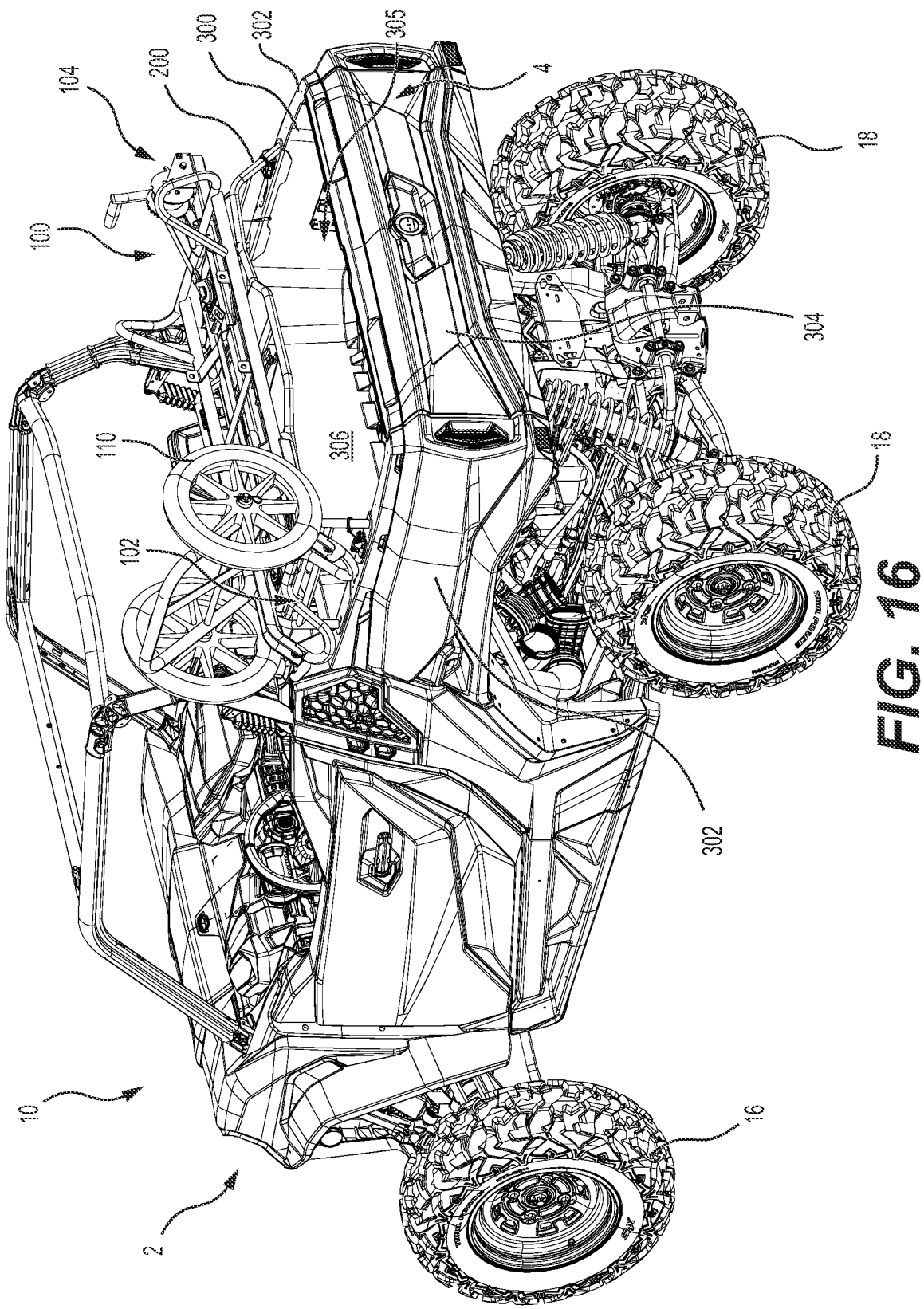
FIG. 16 is a perspective view, taken from a top, rear, left side, of a side-by-side vehicle (SSV) equipped with the loading system according to an embodiment of the present technology.

Furthermore, as mentioned above, the vehicle 10 could be a vehicle other than an ATV in other embodiments. For instance, with reference to FIG. 16, the vehicle 10 could be an SSV. The SSV 10 has a rear cargo bed 300 disposed rearwardly of the driver seat (not shown). The rear cargo bed 300 has left and right side walls 302, a rear wall 304 extending between the two side walls 302, and a front wall 306. The rear wall 304 is a tailgate. The walls 302, 304, 306 define a cargo bed space 305 therebetween. In this embodiment, the rear cargo rack 200 is connected to the opposite side walls 302 (e.g., mechanically fastened thereto) so that the rear cargo rack 200 extends above part of the cargo bed space 305. The mounting assembly 102 and winch 104 are connected to the rear cargo rack 200 in the manner described above, and the buggy 110 is mounted onto the mounting assembly 102 and thereby loaded on the SSV 10 in the same manner as described above. In other embodiments, the SSV 10 could have a front cargo rack disposed forward of the driver seat, such as described above with respect to the ATV, and the buggy 110 could therefore be connected to the front cargo rack instead.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A loading system for a vehicle, comprising:
    a buggy for transporting cargo, the buggy having an upper portion and a lower portion, the buggy comprising:
        a buggy frame comprising at least one elongated member, the at least one elongated member extending generally vertically when the buggy is upright;
        a handle disposed at the upper portion of the buggy and configured for handling by a user;
        a lower platform disposed at the lower portion of the buggy, the lower platform being configured for supporting cargo; and
        at least one wheel for rolling the buggy on a ground surface; and
    a mounting assembly for loading the buggy onto the vehicle, the mounting assembly being configured to be connected to the vehicle, the mounting assembly comprising:
        at least one sliding rail configured to slidingly receive the at least one elongated member of the buggy frame to allow the buggy to slide along the at least one sliding rail,
        each of the at least one sliding rail having a first portion and a second portion extending at an angle relative to the first portion such that, when the mounting assembly is connected to the vehicle, the first portion extends generally horizontally and the second portion extends downwardly from the first portion,
        the second portion being configured to slide the buggy upwards onto the vehicle,
        the first portion being configured to slide the buggy generally horizontally into a loaded position on the vehicle.

2. The loading system of claim 1, wherein the mounting assembly further comprises a locking device configured to lockingly engage a part of the buggy in the loaded position to retain the buggy to the mounting assembly in the loaded position.

3. The loading system of claim 2, wherein the part of the buggy that is lockingly engaged by the locking device is the handle such that the locking device is configured to retain the upper portion of the buggy to the mounting assembly in the loaded position.

4. The loading system of claim 2, wherein the locking device is movable between a locked position and an unlocked position, the locking device being biased to be in the locked position.

5. The loading system of claim 4, wherein:
    the locking device comprises a rotating bracket;
    in the locked position, the rotating bracket at least partly surrounds the part of the buggy to retain the buggy to the mounting assembly; and
    in the unlocked position, the rotating bracket is clear of the part of the buggy to allow the part of the buggy to disengage the locking device.

6. The loading system of claim 2, wherein:
    the mounting assembly has a first end portion and a second end portion opposite the first end portion;

the second portion of each of the at least one sliding rail is disposed at the first end portion of the mounting assembly; and the locking device is disposed at the second end portion of the mounting assembly.

7. The loading system claim 1, wherein:

the buggy frame further comprises a lower cross-member extending transversally to the at least one elongated member at the lower portion of the buggy; and the mounting assembly defines a locking slot that at least partially receives the lower cross-member therein in the loaded position of the buggy to retain the lower portion of the buggy to the mounting assembly.

8. The loading system of claim 1, wherein the mounting assembly is configured to be removably connected to the vehicle, the mounting assembly further comprising at least one anchor for removably connecting the mounting assembly to an anchor fixture disposed on the vehicle, the anchor fixture selectively retaining the at least one anchor.

9. The loading system of claim 8, wherein the at least one anchor comprises:

a fastener portion configured to be received in an anchor chamber defined at least in part by the anchor fixture, the fastener portion being movable between a locked position and an unlocked position; and an actuator portion operatively connected to the fastener portion, the actuator portion being movable by the user to move the fastener portion between the locked position and the unlocked position, the fastener portion being shaped such that, when the fastener portion is received in the anchor chamber, in the locked position, the fastener portion is retained by the anchor fixture and, in the unlocked position, the fastener portion is removable from the anchor fixture.

10. The loading system of claim 8, wherein:

the at least one anchor includes a first anchor and a second anchor;

the first anchor is disposed at a first end portion of the mounting assembly; and the second anchor is disposed at a second end portion of the mounting assembly opposite the first end portion.

11. The loading system of claim 1, further comprising a winch for moving the buggy onto the mounting assembly and into the loaded position, the winch comprising:

a rotatable reel;

a line reeled about the reel; and a hook disposed at an end of the line for connecting the winch to the buggy.

12. The loading system of claim 11, wherein the winch is connected to the mounting assembly.

13. The loading system of claim 11, wherein:

the mounting assembly has a first end portion and a second end portion opposite the first end portion;

the second portion of each of the at least one sliding rail is disposed at the first end portion of the mounting assembly; and the winch is connected to the second end portion of the mounting assembly.

14. The loading system of claim 13, wherein:

the winch is rotatably connected to the mounting assembly, the winch being rotatable between a deployed position and a stowed position;

in the deployed position of the winch, the line is reeled onto the reel in a first direction that is generally parallel to the at least one sliding rail of the mounting assembly; and in the stowed position of the winch, the line is reeled onto the reel in a second direction at an angle relative to the first direction.

15. The loading system of claim 14, wherein the winch is rotated by approximately 90° between the deployed and stowed positions.

16. The loading system of claim 14, wherein a distance measured, along a direction parallel to the first portion of the at least one sliding rail, between the first end portion of the mounting assembly and a furthest point on the winch from the first end portion of the mounting assembly is greater in the deployed position of the winch than in the stowed position of the winch.

17. The loading system of claim 11, wherein the winch is manually operated by the user to reel the line about the reel.

18. The loading system of claim 11, wherein:

the mounting assembly further comprises:

a mounting assembly frame; and a line angle modifier pivotably connected to the mounting assembly frame, the line angle modifier having a line supporting end defining a cam surface;

the line angle modifier is pivotable relative to the mounting assembly frame between a lifting position and a resting position;

in the lifting position, the line angle modifier extends outward from the mounting assembly frame such that the line is extendable about the cam surface to modify an angle of approach of the line to the buggy; and in the resting position, the line angle modifier lies flat against the mounting assembly frame.

19. The loading system of claim 18, wherein:

the buggy frame further comprises a lower cross-member extending transversally to the at least one elongated member at the lower portion of the buggy; and the mounting assembly defines a locking slot that at least partially receives the lower cross-member therein in the loaded position of the buggy to retain the lower portion of the buggy to the mounting assembly.

20. The loading system of claim 1, wherein the mounting assembly further comprises a tongue configured to interlock with an accessory rack of the vehicle to impede movement of the mounting assembly relative to the vehicle in a direction transverse to the first portion of each of the at least one sliding rail.

* * * * *